United States Patent
Crandall et al.

(10) Patent No.: US 9,103,642 B2
(45) Date of Patent: Aug. 11, 2015

(54) ENGAGING AMMUNITION PROJECTILES

(71) Applicant: GRIP-N-PULL, LLC, Blackfoot, ID (US)

(72) Inventors: N. Eugene Crandall, Pocatello, ID (US); Brandon R. Williams, Blackfoot, ID (US)

(73) Assignee: GRIP-N-PULL, LLC, Blackfoot, ID (US)

( * ) Notice: Subject to any disclaimer, the term of this patent is extended or adjusted under 35 U.S.C. 154(b) by 0 days.

(21) Appl. No.: 14/262,656

(22) Filed: Apr. 25, 2014

(65) Prior Publication Data

US 2014/0318353 A1 Oct. 30, 2014

Related U.S. Application Data

(60) Provisional application No. 61/816,681, filed on Apr. 26, 2013.

(51) Int. Cl.
| | | |
|---|---|---|
| *F42B 33/06* | (2006.01) | |
| *F42B 33/00* | (2006.01) | |
| *A47J 27/04* | (2006.01) | |
| *F24C 15/32* | (2006.01) | |

(52) U.S. Cl.
CPC ............... *F42B 33/06* (2013.01); *A47J 27/04* (2013.01); *F24C 15/327* (2013.01); *F42B 33/001* (2013.01); *A47J 2027/043* (2013.01)

(58) Field of Classification Search
USPC ............................. 86/49, 23, 24, 28; 264/39
See application file for complete search history.

(56) References Cited

U.S. PATENT DOCUMENTS

| | | | | |
|---|---|---|---|---|
| 3,580,127 | A * | 5/1971 | Lee ................................... | 86/24 |
| 4,510,842 | A * | 4/1985 | Hlusko ............................. | 86/25 |
| 4,869,148 | A * | 9/1989 | Tucker ............................. | 86/43 |
| 5,050,475 | A * | 9/1991 | Kolmer ............................ | 86/23 |
| 5,125,316 | A * | 6/1992 | Markle ............................. | 86/24 |
| 5,146,043 | A | 9/1992 | Means et al. | |
| 5,533,246 | A | 7/1996 | Ashbrook | |
| 7,779,572 | B2 * | 8/2010 | Potterfield et al. ................. | 42/94 |
| 7,823,317 | B2 * | 11/2010 | Potterfield et al. ................. | 42/94 |
| 7,845,267 | B2 * | 12/2010 | Potterfield et al. ........... | 89/37.04 |
| 7,954,272 | B2 * | 6/2011 | Potterfield et al. ................. | 42/94 |
| 7,997,021 | B2 * | 8/2011 | Cauley et al. ...................... | 42/94 |
| 8,695,985 | B2 * | 4/2014 | Potterfield et al. ............. | 273/407 |
| 2002/0157524 | A1 | 10/2002 | Tuftee | |

OTHER PUBLICATIONS

Corbin Manufacturing & Supply, Inc., The Corbin Handbook & Catalog of Bullet Swaging, 1977, 44-45, No. III, 2nd Edition, Wegferd Publications, USA.

(Continued)

*Primary Examiner* — Michael David
(74) *Attorney, Agent, or Firm* — Flaig Law Office, PLLC; Jason E. Flaig

(57) ABSTRACT

An ammunition projectile engagement apparatus and method for manufacturing and using the ammunition projectile engagement apparatus are described. A first arm, a second arm, and a head are disclosed. The first arm and second arm each contain a handle section and a projectile engagement section. The surface of each projectile engagement section includes at least one engagement feature opposite another engagement feature, which when compressed, together form a pair. Each pair, when compressed together, forms at least a partial circumference for engaging a projectile.

20 Claims, 29 Drawing Sheets

(56) References Cited

OTHER PUBLICATIONS

Picture of bullet puller provided to N. Eugene Crandall sometime prior to 1967.
Picture of the same bullet puller provided to N. Eugene Crandall sometime prior to 1967, taken from a different angle and in front of a different surface.
Corbin Manufacturing & Supply, Inc., Corbin Handbook & Catalog, Apr. 1, 1976, page unknown. No. II, 2nd Edition, publisher unknown.
Corbin Manufacturing & Supply, Inc., Advertising copy with tagline "Everything for Bullet Swagging . . . From", likely published during 1970s and 1980s, other details unknown.
Sean Newton, Pulling Bullets with an RW Hart Bullet Puller, Jan. 10, 2012 (date unconfirmed), pp. 1-5, http://thegunwiki.com/Gunwiki/ProcPullBulletWithHart, other information unknown, accessed Apr. 29, 2015, as indicated on header.
Speedy Gonzales, Speedys Guide to Benchrest, 2004 (date unconfirmed), pp. 1, 27-28, http://www.benchrest,se/?page_id=143, Swedish Bench est Shooters Association, Sweden, other information unknown, accessed Apr. 29, 2015, as indicated on header.
Technisch Lamar Bureau, Accessories, 2012 (date unconfirmed), pp. 1, 55, http://www.lamartechniek.nl/Pages/Accessoires.aspx, Technisch Lamar Bureau, Netherlands (unconfirmed), other information unknown, accessed Apr. 30, 2015, as indicated on header.
Nitroman, Thread: Bullet puller for 50 caliber . . . , Mar. 20, 2008 (date unconfirmed), pp. 1-4, http://forums.outdoorsdirectory.com/showthread.php/27554-Bullet-puller-for-50-caljber, other information unknown, accessed Apr. 29, 2015, as indicated on header.
Sinclair International, Davidson—Davidson Plier Style Bullet Pullers, pp. 1-2, http://www.sinclairintl.com/reloading-equipment/case-preparation/davidson-plier-style-bullet-pullers-prod34463.aspx, Brownells, Inc., other information unknown, accessed Apr. 29, 2015, as indicated on header.

* cited by examiner

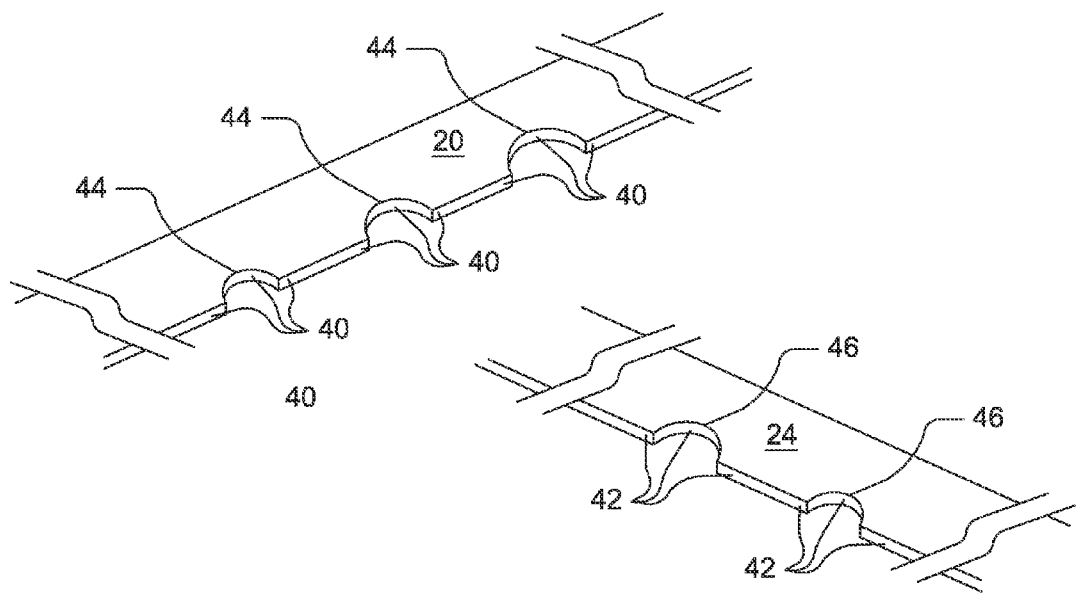
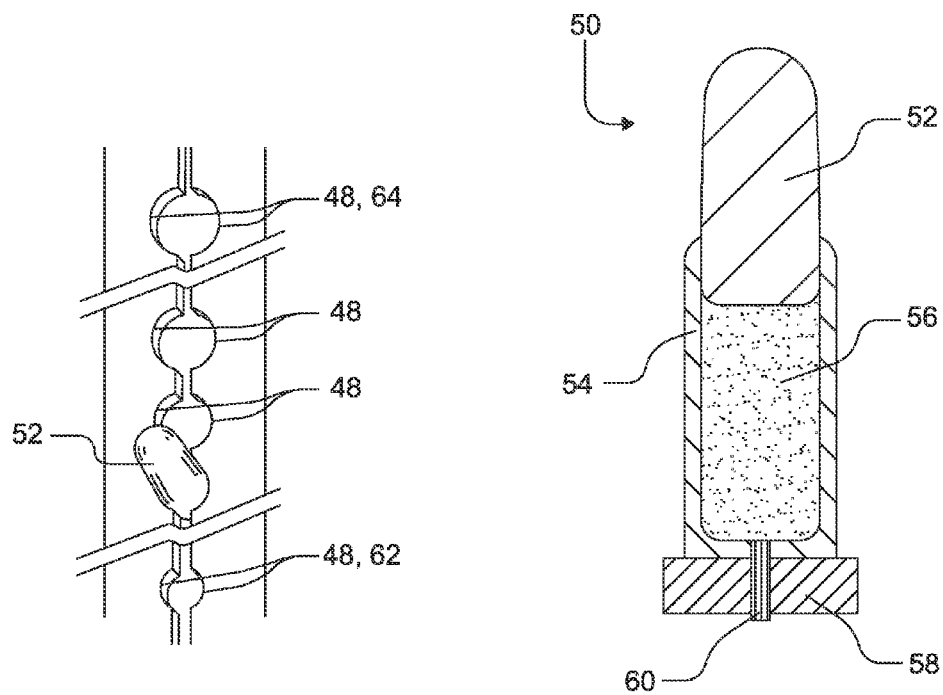
FIG. 3
FIG. 4
FIG. 5

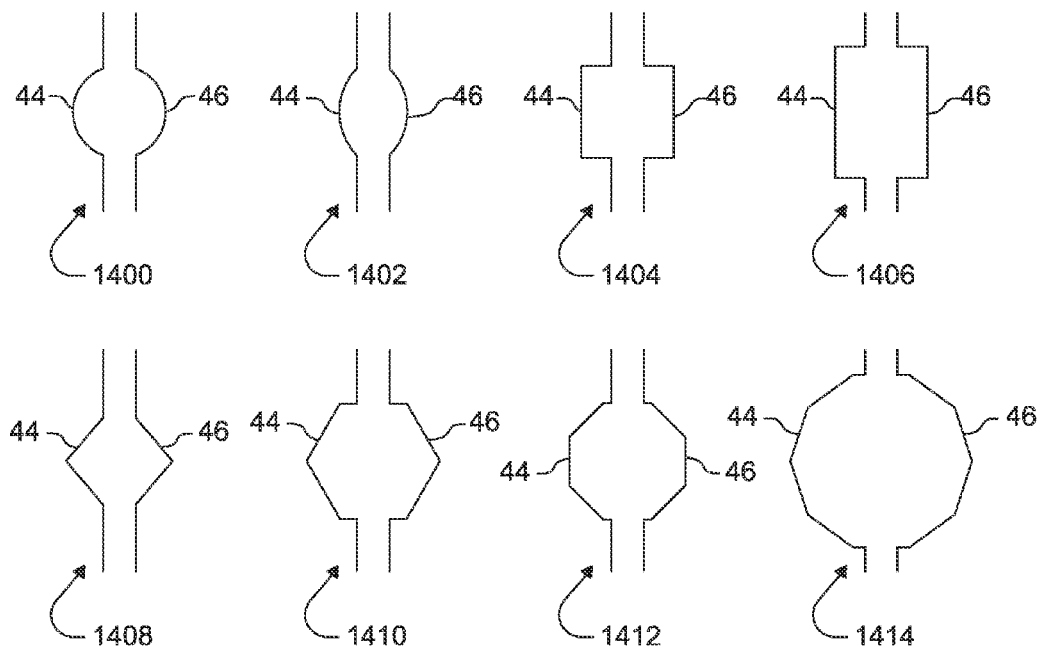
FIG. 14
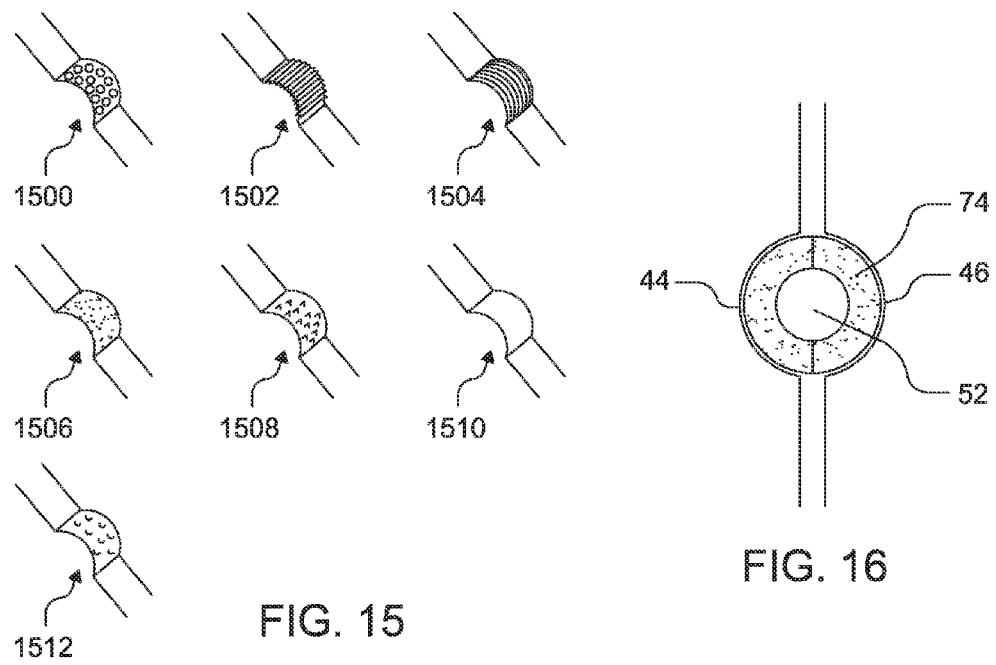
FIG. 15
FIG. 16

ENGAGING AMMUNITION PROJECTILES

CROSS-REFERENCES TO RELATED APPLICATION

This application claims the benefit of and priority to:
Prior U.S. Provisional Application No. 61/816,681, filed on Apr. 26, 2013, and is entitled "AMMUNITION BULLET PULLER".

The entire content of the above document is hereby incorporated herein by reference as part of this application.

BACKGROUND

The present disclosure relates to the field of engaging ammunition projectiles.

Many gun enthusiasts reload spent cartridges for a variety of reasons. The reloading process usually involves a variety of steps. Devices for engaging ammunition projectiles may be useful in the reloading process. Overall, the reloading process may be accomplished by a variety tools and methods.

SUMMARY

In one aspect, an ammunition projectile engagement apparatus, also referred to as an instrument herein, may include a first arm, a second arm, and a head. The first arm, the second arm and the head may each be part of a single piece of material. The first arm and second arm may be elongated. The first arm may include at least a first arm handle section and a first arm projectile engagement section. The second arm may include at least a second arm handle section and a second arm engagement section. The first arm projectile engagement section and the second arm projectile engagement section may be separated by a channel. The first arm projectile engagement section may include at least a first inner projectile surface facing the channel. The second arm projectile engagement section may include at least a second inner projectile surface facing the channel. The first inner projectile surface and the second inner projectile surface may substantially face each other. The first inner projectile surface may include at least one engagement feature. The second inner projectile surface may include at least one engagement feature. The shape(s) of the engagement features on the first inner projectile surface and second inner projectile surface may vary. At least one engagement feature on the first inner projectile surface may be opposite at least one engagement feature on the second inner projectile surface. Each oppositely situated set of engagement features may form a pair. Each pair, when compressed together, may form or otherwise create the shape of a circumference, circle, oval, or other shape for engaging a projectile. The head may be configured to permit the first arm and second arm to move at least towards each other. The first arm, the second arm, and the head may be configured to resiliently bend as the first and second arms are forced towards each other.

Implementations may also include one or more of the following features. The head may adjoin the first arm and second arm. The channel may vary in width to accommodate different sizes, dimensions, types, kinds and calibers of projectiles.

Implementations may also include one or more of the following features. The first inner projectile surface may include a plurality of different diameter sized engagement features. The second inner projectile surface may include a second plurality of different diameter sized engagement features. The shape of the engagement features on the first inner projectile surface and second inner projectile surface may vary.

The plurality of pairs may include at least a first pair and a last pair. The plurality of pairs may be defined by a first sequence of the plurality of different diameter sized engagement features on the first inner projectile surface in alignment with and opposite a second sequence of the plurality of different diameter sized engagement features on the second inner projectile surface. The plurality of pairs may be arranged in descending, ascending, alternating, random, or other order. For example, the last pair may have the largest diameter of the pairs and may be configured closest to the head and the first pair may have the smallest diameter and may be configured furthest from the head. At least one of the caliber sizes of the projectile for which a pair of engagement features are intended to engage may be identified on the instrument next to at least one of the pairs intended to engage that particular caliber sized projectile. The least one of the caliber sizes may be applied to the apparatus by a process selected from at least one of the following: engraving, etching, laser burning, stamping, milling, forging, drilling, grinding, casting, painting, inking, writing and applying additional material Implementations may also include one or more of the following features. The diameter of each pair, when compressed together, may be slightly larger along at least one portion of the diameter of the pair than the caliber size of a correspondingly-sized projectile for which the pair is intended to engage. Each pair, when compressed together, may be configured to directly engage a projectile.

Implementations may also include one or more of the following features. The first arm handle section may include a first outer surface. The first outer surface of the first arm handle section may include at least one concave curve that may be shaped to accommodate an operator's convexly profiled fingers. The first outer surface of the first arm handle section may include at least four concave curves that may be shaped to accommodate an operator's convexly profiled fingers. The second arm handle section may include a second outer surface. At least a portion of the second outer surface may form a convex curve shaped to accommodate an operator's concavely profiled o palm.

Implementations may also include one or more of the following features. The first arm handle section and second arm handle section may be covered by a second material which may be different from the single piece of material. The single piece of material may be formed from a single sheet of material. The instrument may be formed from at least one or a combination of more than one of the following of materials: metals such as aluminum, copper, iron, tin, gold, lead, silver, titanium, uranium, and zinc; alloys such as stainless steel, steel (iron and carbon), brass (copper and zinc), bronze (copper and tin), duralumin (aluminum and copper) and gunmetal (copper, tin, and zinc); non-metals; other materials; and/or composites such as fiberglass, plastic, wood, carbon fiber, and polyether ether ketone (PEEK).

In another aspect, manufacturing an ammunition projectile engagement apparatus, or instrument, may include forming the apparatus with at least one outer edge of the apparatus, at least one edge of an engagement feature of the apparatus, and at least one surface of an engagement feature of the apparatus; rounding the at least one outer edge of the apparatus; altering the at least one edge of an engagement feature and the at least one surface of an engagement feature; removing extraneous material from the apparatus; and/or treating, altering, polishing and/or finishing any surface of the apparatus. The altering of the at least one edge of an engagement feature and the at least one surface of an engagement feature may be accomplished by means of sand blasting. The finishing of the at least one surface of the apparatus may accomplished by means of tumbling.

Implementations may also include one or more of the following features. One or more projectile caliber size on the apparatus may be identified on the apparatus next to one or more of the pair of engagement features intended to engage a projectile of the caliber identified. At least one of the caliber size identifications may be applied to the instrument by at least one or a combination of more than one of the following processes: engraving, etching, lasering, stamping, milling, forging, drilling, grinding, casting, painting, inking, writing and/or applying additional material. The apparatus may be colored, dyed, stained or painted. The apparatus may include a first arm handle section and a second arm handle section. Coverings may be placed on the first arm handle section and the second arm handle section.

In another aspect, engaging a projectile using an ammunition projectile engagement apparatus, or instrument, may include actuating a reloading press to a loading position; loading a cartridge containing a projectile onto a shell holder of the reloading press; optionally placing an instrument adjacent the reloading press, anticipating the approximating of the cartridge; approximating the ram of the reloading press and attached cartridge towards the instrument; exposing the projectile through a receptacle; placing a pair of opposite and similarly sized engagement features of the instrument around the exposed projectile; compressing the pair to form a friction fit between the pair and the projectile; maintaining compression of the pair while separating the ram from the instrument thereby removing the projectile from a casing of the cartridge; and/or releasing the compression, so that the pair resiliently separates thereby releasing the projectile from the instrument.

Implementations may also include one or more of the following features. Actuating a reloading press to a loading position; loading a cartridge containing a projectile onto a shell holder of the reloading press; placing a tube structure over the cartridge, onto the base of the reloading press and around the ram; optionally placing an apparatus adjacent the tube structure, anticipating the approximating of the cartridge; approximating the ram of the reloading press and attached cartridge towards the apparatus; exposing the projectile; placing a pair of opposite and similarly sized engagement features of the apparatus around the exposed projectile; compressing the pair to form a friction fit between the pair and the projectile; maintaining compression of the pair while separating the ram from the apparatus thereby removing the projectile from a casing of the cartridge; and/or releasing the compression so that the pair resiliently separates thereby releasing the projectile from the apparatus.

These general and specific aspects may be implemented by using an apparatus, system, and/or method or any combination thereof.

Certain implementations may have one or more of the following advantages:

The apparatus may be formed from a single piece of material or multiple pieces of material. The material used to form the apparatus may compose a single sheet of material wherein multiple apparatus may be formed. Such may decrease manufacturing time, cost and processes, decrease the apparatus' complexity and risk of malfunctioning and breaking; all of or any of which, may lead to a decrease in costs to the purchaser and increase in the apparatus' strength, durability and safety.

The apparatus may or may not be designed and formed to be simple to use and/or with or without requiring retooling or changing out different parts or accessories.

Different aspects, structures and features of the apparatus may be configured in a variety of ways and/or combined with other aspects, structures and features in a variety of ways. Such may increase the instrument's effectiveness in engaging different sizes, dimensions, types, kinds and calibers of projectiles.

The apparatus may include a convexly curved handle section wherein an operator's concavely shaped palm may rest and/or grip the apparatus, and/or a plurality of concave curves or indentations that fit an operator's convexly shaped fingers, which concave curves or indentations may increase an operator's ergonomic comfort and handling when using the instrument, and provide additional positions for an operator to place his/her fingers in order to increase gripability and leverage when using the apparatus.

The apparatus may be custom made. Its color and/or stain, series of different sized engagement features and/or material makeup may be changed to meet an operator's needs and purposes for using the apparatus and to match the type of ammunition an operator uses. Coverings may also be added to at least the handle section of the arm members for added comfort and gripability.

The apparatus may be custom formed to engage one or more sizes, dimensions, types, kinds and calibers of projectiles to meet an operator's needs and purposes for using the apparatus, to match the type of ammunition an operator's uses, and to allow an operator to extract a large number of projectiles in a very short period of time.

The apparatus may include specifically sized engagement features that minimize projectile damage and/or maintain their future usability.

The apparatus may include labels or identifications of the particular types of calibers it is formed to engage. The identification may be etched into the apparatus thereby reducing the likelihood that the identification will wear off of the apparatus.

The apparatus may maintain the composure and composition of the different parts of a loaded cartridge, thereby minimizing mess and cross contamination of the extraction process.

The apparatus may be simple and easy to use; thereby allowing an operator to quickly engage large amount of projectiles.

The apparatus may be used for a variety of uses.

Embodiments of the apparatus may not achieve any or all of the advantages stated herein. Not all advantages of the instrument have been listed herein. Other aspects, features and advantages may be apparent from the following detailed description, the drawings and the claims.

BRIEF DESCRIPTION OF THE DRAWINGS

Various embodiments of the present disclosure will now be discussed with reference to the appended drawings. It is appreciated that these drawings depict only typical embodiments of the invention and are therefore not to be considered limiting of its scope.

FIG. 3 is a perspective view, showing the projectile engagement sections of the apparatus;

FIG. 4 is an exploded perspective view of a portion of FIG. 2, showing the projectile engagement sections of the apparatus engaging a projectile;

FIG. 5 is a cross-sectional view, showing one embodiment of a cartridge and its parts;

FIG. 14 is a perspective view, showing various configurations of the projectile engagement sections of the apparatus;

FIG. 15 is a side view, showing various configurations of the inner surface of projectile engagement sections of the apparatus;

FIG. 16 is a perspective view, showing a pair of engagement features in the projectile engagement sections of the apparatus fitted with a material for engaging a projectile;

DETAILED DESCRIPTION

The subject matter relates to engaging ammunition projectiles. The following description illustrates the principles of the disclosure, which may be applied in various ways to provide many different alternative embodiments. This description is not meant to limit the disclosure's concepts.

The present technology may be employed in engaging ammunition projectiles. While exemplary embodiments of the present technology have been shown and described in detail below, it will be clear to the person skilled in the art that changes and modifications may be made without departing from its scope. As such, that which is set forth in the following description and accompanying drawings is offered by way of illustration only and not as a limitation. In addition, one of ordinary skill in the art will appreciate upon reading and understanding this disclosure that other variations for the technology described herein can be included within the scope of the present technology.

Figure 1:
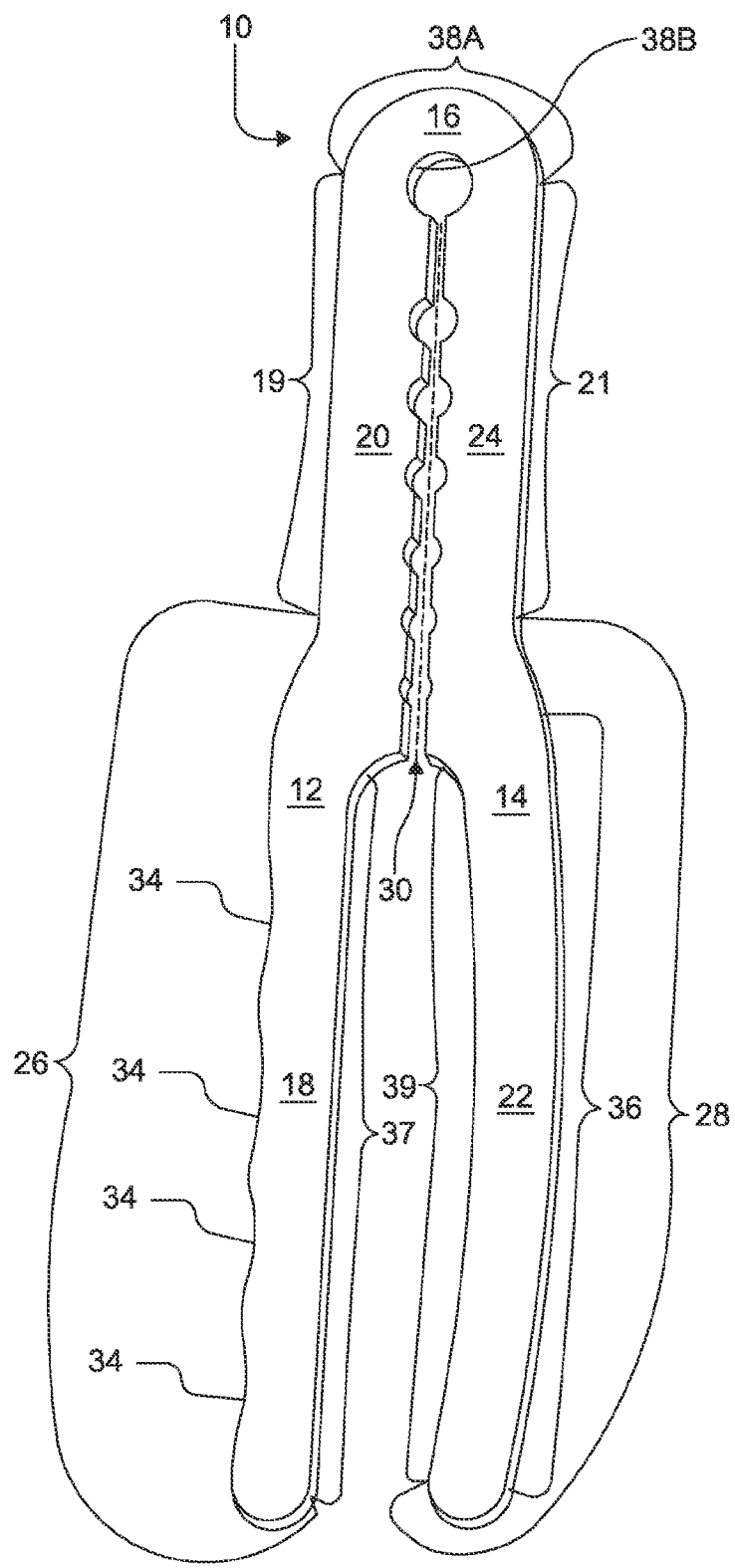
FIG. 1 is a perspective view, showing one embodiment of an ammunition projectile engagement apparatus.

Referring to FIG. 1 and subsequent figures, an ammunition projectile engagement apparatus 10 and also as instrument 10, may be designed, manufactured, formed, structured, and used to engage a projectile component of a cartridge. For example, engaging projectiles may including securing, holding, twisting, compressing, removing, extracting, anchoring, stabilizing, manipulating and/or gripping projectiles. Referring to FIG. 5, a typical cartridge 50 may include, for example, the following components: a projectile or bullet 52, a casing 54, gun powder or propellant 56, a rim 58, and a primer 60. Cartridge 50, and its components (including without limitation, projectiles 52), may be of various sizes, dimensions, types, kinds and calibers.

Referring to FIG. 1 and subsequent figures, instrument 10 and each and every component and feature of instrument 10 (whether expressly stated herein or not), may be configured and manufactured to be a variety of shapes, sizes, dimensions, lengths, widths, heights, angles, textures, surfaces, edges, configurations, from a variety of materials, for any reason or purpose, and any combinations of such. Instrument 10 may be custom made. Instrument 10 may be configured to match a variety of projectiles of different sizes, dimensions, types, kinds and calibers. Such versatility may simplify the use of instrument's 10; increase an operator's ergonomic comfort, handling and leverage when using instrument 10; increase the ability for instrument 10 to engage projectiles 52; increase the number of projectiles 52 an operator may engage during a specific period of time; increase the different sizes, dimensions, types, kinds and calibers of projectiles 52 an operator may engage; increase the durability, strength and safety of instrument 10; decrease damage done to projectiles 52 when using instrument 10 to engage projectiles 52; decrease manufacturing time and costs; and/or decrease the sales price to purchasers.

Referring to FIGS. 1-19, an ammunition projectile engagement apparatus 10, also called instrument 10, may include an arm 12, an arm 14, and a head 16.

Figure 2:
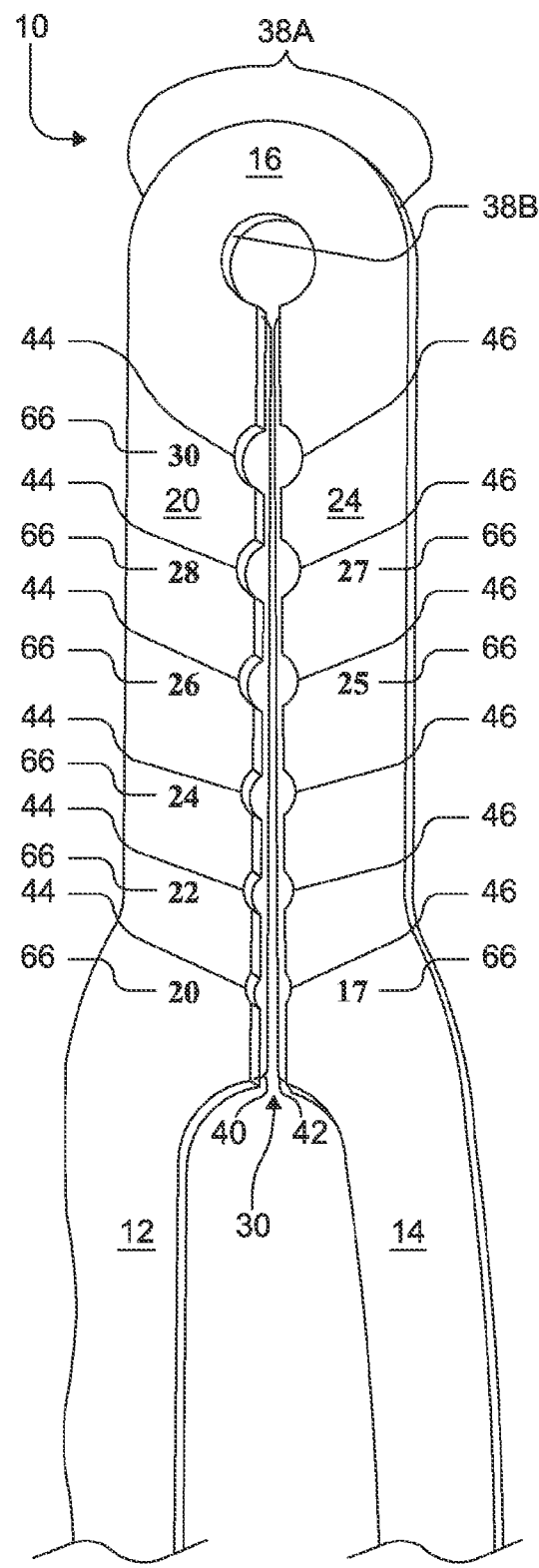
FIG. 2 is an exploded perspective view of a portion of FIG. 1, showing projectile engagement sections of the apparatus.

Referring to FIG. 1, head 16 may be configured to permit arm 12 and arm 14 to move towards each other when compression force is applied to arm 12 and arm 14. Arm 12, arm 14, and head 16 may be configured to resiliently bend as arm 12 and arm 14 are forced towards each other. Head 16 may adjoin arm 12 and arm 14 (FIGS. 1 and 2). The width, length and height of arm 12, arm 14 and head 16 may vary. Arm 12 and arm 14 may be elongated (FIGS. 1 and 2).

Arm 12, arm 14 and head 16 may each be part of a single type of material or multiple types of material(s). For example, material(s) may include metals such as aluminum, copper, iron, tin, gold, lead, silver, titanium, uranium, and zinc; alloys such as stainless steel, steel (iron and carbon), brass (copper and zinc), bronze (copper and tin), duralumin (aluminum and copper) and gunmetal (copper, tin, and zinc); non-metals; other materials; and/or composites such as fiberglass, plastic, wood, carbon fiber, and polyether ether ketone (PEEK), and/or combinations of the same. Arm 12, arm 14 and head 16 may each be part of a single piece of material (FIGS. 1 and 2) or multiple pieces of material(s). The material used to form the apparatus may from a single sheet of material or multiple sheets of material. In the instance where arm 12, arm 14 and head 16 are each part of a single piece of material and/or where the apparatus is formed from a single sheet of material, multiple apparatus may be formed and such may decrease manufacturing time and costs, simply the manufacturing process and design, make the apparatus simple to use, decrease the apparatus' complexity, and decrease the risk of it malfunctioning and breaking; all of or any of which, may lead to a decrease in costs to the end consumer and increase in its strength, durability and safety.

Figure 8:
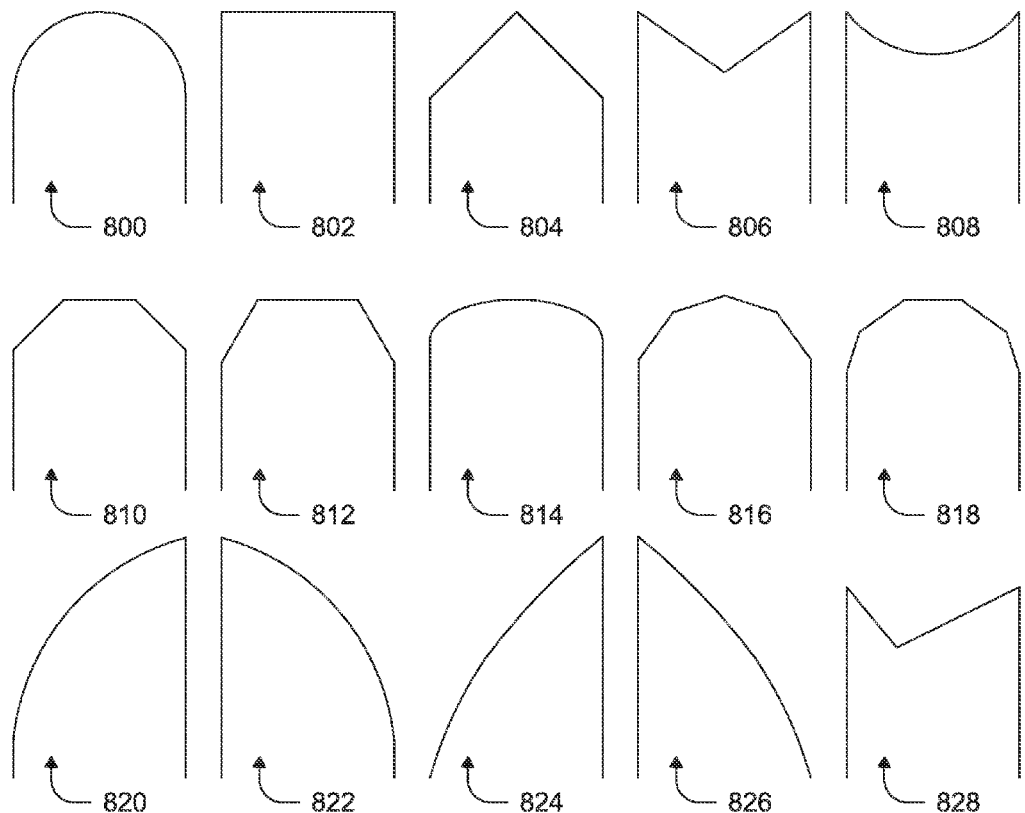
FIG. 8 is a perspective view, showing various configurations of an outer surface of a head of the apparatus.
Figure 9:
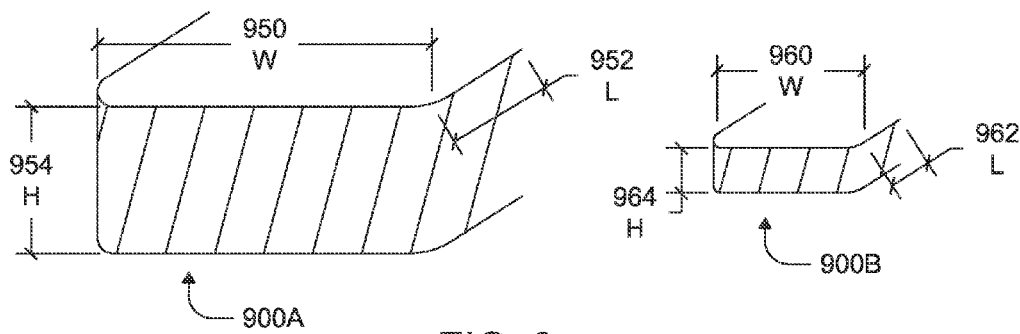
FIG. 9 is a three-dimensional view, showing various lengths, widths and heights of the outer surface of the head of the apparatus.

Referring to FIGS. 1, 8 and 9, head 16 may include an outer surface 38A and an inner surface 38B, which may be configured to a variety of shapes For example, outer surface 38A may form shapes (FIG. 8) that are substantially semi-circle 800, semi-square 802, semi-diamond 804, notched or "M" shape 806, concaved 808, semi-octagon 810, semi-hexagon 812, semi-oval 814, semi-decagon 816, semi-nonagon 818, half-oval rounded to the left 820, half-oval rounded to the right 822, fin rounded to the left 824, fin rounded to the right 826, uneven notch 828 or another shape or combinations of shapes. The width 950, 960, length 952, 962 and height 954, 964 of the outer surface 38A (900A, 900B) may vary (FIG. 9).

Figure 10:
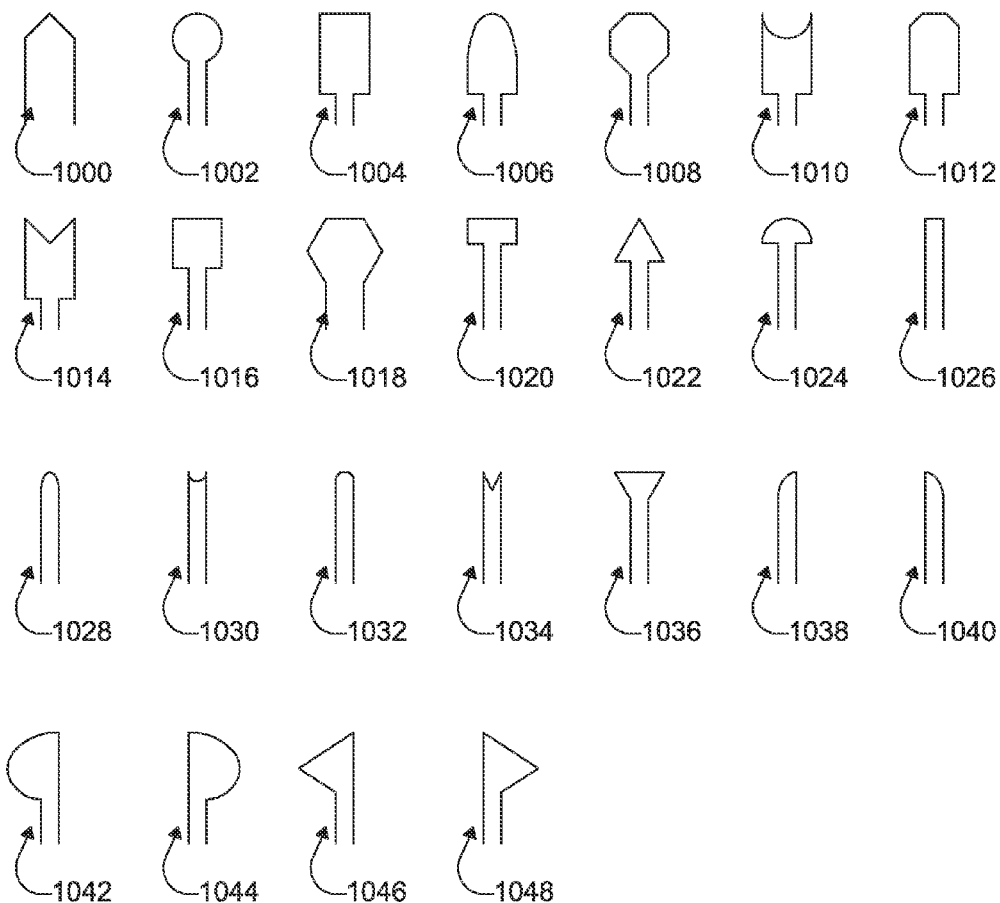
FIG. 10 is a perspective view, showing various configurations of an inner surface of the head of the apparatus.
Figure 11:
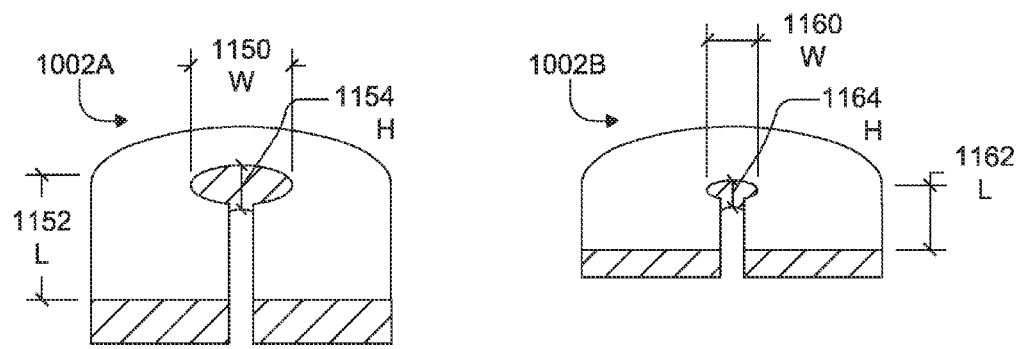
FIG. 11 is a three-dimensional view, showing various lengths, widths and heights of the inner surface of the head of the apparatus.
Figure 12:
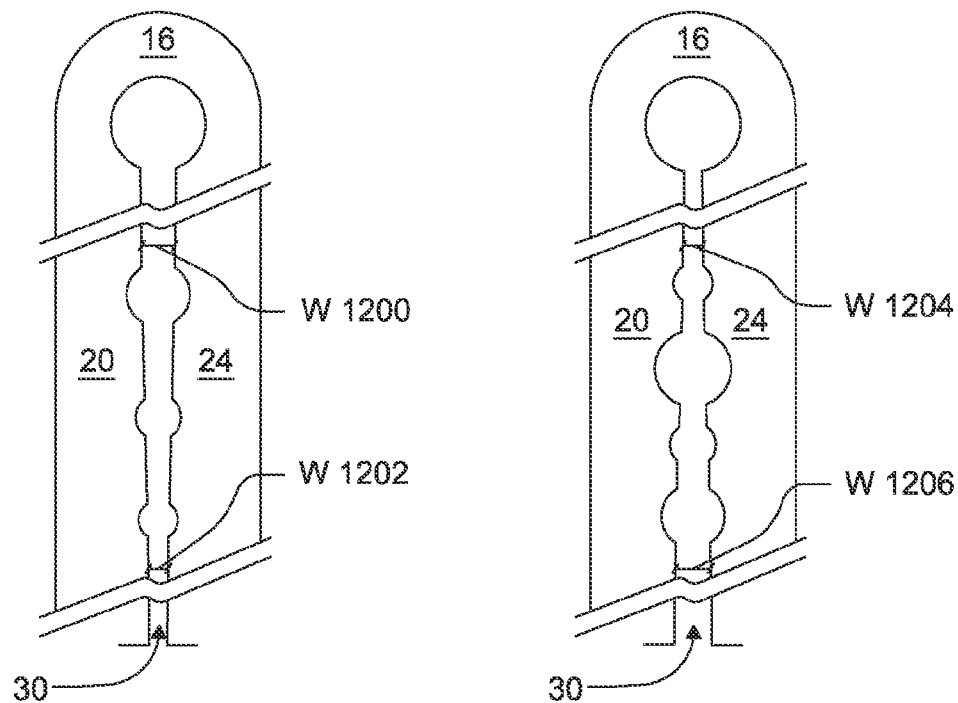
FIG. 12 is a perspective view, showing various widths of a channel configured between the projectile engagement sections of the apparatus.
Figure 13:
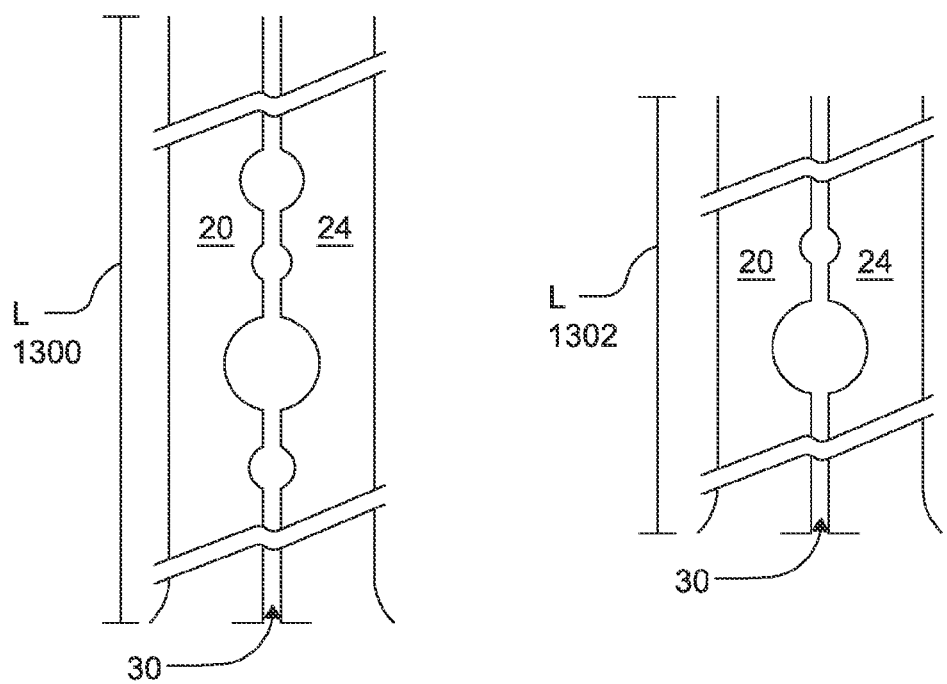
FIG. 13 is a perspective view, showing various lengths of the channel configured between the projectile engagement sections of the apparatus.

Referring to FIGS. 1, 10 and 11, inner surface 38B may form a variety of shapes. For example, inner surface 38B may form shapes (FIG. 10) that are substantially a semi-diamond 1000, circle 1002, rectangle 1004, 1026, oval 1006, 1028, octagon 1008, 1032, crescent 1010, 1030, squared-octagon 1012, notched or "M" shape 1014, 1034, square 1016, hexagon 1018, "T" shape 1020, arrow 1022, mushroom or semi-circular 1024, octagon 1032, triangle 1036, half-oval rounded to the left 1038, half-oval rounded to the right 1040, "P" shape to the left 1042, "P" shape to the right 1044, flagged to the left 1046, flagged to the right 1048 or other shape or combinations of shapes. The width 1150, 1160 length 1152, 1162 and height 1154, 1164 (FIG. 11) of the inner surface 38B (1002A, 1002B) may vary.

Figure 19:
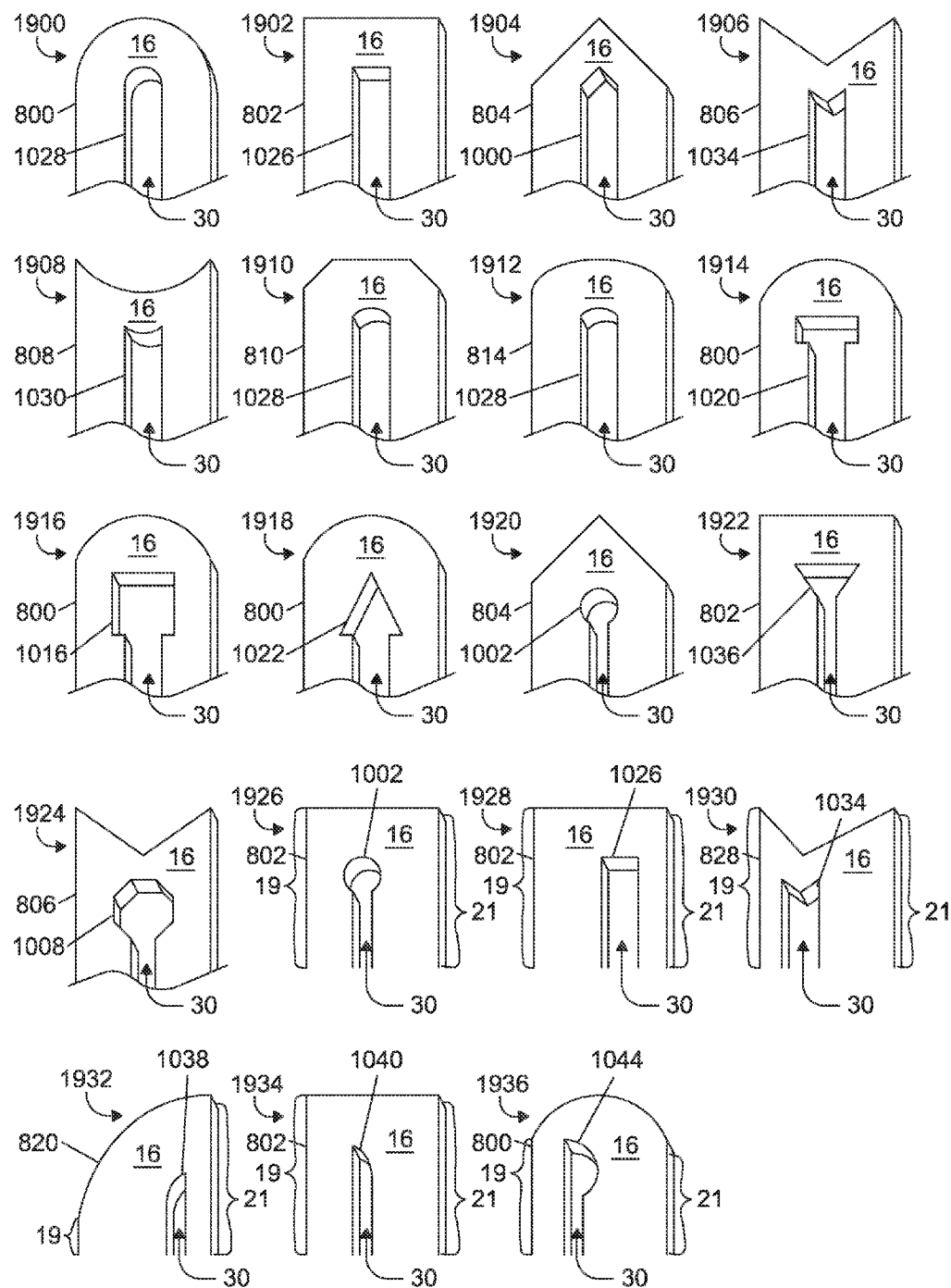
FIG. 19 is a perspective view, showing combinations of various outer surfaces of the head and inner surfaces of the head.

Referring to FIGS. 1 and 19, any outer surface 38A shape may be combined with any inner surface 38B shape to form head 16 (FIG. 19). For example, the semi-circle 800 outer surface 38A may be combined 1900 with the oval 1028 inner surface 38B to form head 16; the semi-square 802 outer surface 38A may be combined 1902 with the rectangle 1026 inner surface 38B to form head 16; the semi-diamond 804 outer surface 38A may be combined 1904 with the semi-diamond 1000 inner surface 38B to form head 16; the notched 806 outer surface 38A may be combined 1906 with the notched 1034 inner surface 38B to form head 16; the concave 808 outer surface 38A may be combined 1908 with the crescent 1030 inner surface 38B to form head 16; the semi-octagon 810 outer surface 38A may be combined 1910 with the oval 1028 inner surface 38B to form head 16; the semi-oval 814 outer surface 38A may be combined 1912 with the oval 1028 inner surface 38B to form head 16; the semi-circle 800 outer surface 38A may be combined 1914 with the "T" shape 1020 inner surface 38B to form head 16; the semi-circle 800 outer surface 38A may be combined 1916 with the square 1016 inner surface 38B to form head 16; the semi-circle 800 outer surface 38A may be combined 1918 with the arrow 1022 inner surface 38B to form head 16; the semi-diamond 804 outer surface 38A may be combined 1920 with the circle 1002 inner surface 38B to form head 16; the semi-square 802 outer surface 38A may be combined 1922 with the triangle 1036 inner surface 38B to form head 16; and the notched 806 outer surface 38A may be combined 1924 with the octagon 1008 inner surface 38B to form head 16.

Any inner surface 38B shape may be configured in any location within head 16 and projectile engagement section 20 (including, without limitation, outer projectile surface 19) and projectile engagement section 24 (including, without limitation, the outer projectile surface 21) (FIG. 19). For example, the semi-square 802 outer surface 38A may be combined 1926 with the circular 1002 inner surface 38B to form head 16 wherein the midline of the channel 30 is closer to outer projectile surface 19 than outer projectile surface 21; the semi-square 802 outer surface 38A may be combined 1928 with the elongated rectangle 1026 inner surface 38B to form head 16 wherein the midline of the channel 30 is closer to outer projectile surface 21 than outer projectile surface 19; the uneven notch 828 outer surface 38A may be combined 1930 with the elongated notched or "M" shape 1034 inner surface 38B to form head 16 wherein the midline of the channel 30 is closer to outer projectile surface 19 than outer projectile surface 21; the half-oval rounded to the left 820 outer surface 38A may be combined 1932 with the half-oval rounded to the left 1038 inner surface 38B to form head 16 wherein the midline of the channel 30 is closer to outer projectile surface 21 than outer projectile surface 19; the semi-square 802 outer surface 38A may be combined 1934 with the half-oval rounded right 1040 inner surface 38B to form head 16 wherein the midline of the channel 30 is closer to outer projectile surface 19 than outer projectile surface 21; and the semi-circle 800 outer surface 38A may be combined 1936 with the "P" shape right 1044 inner surface 38B to form head 16 wherein the midline of the channel 30 is closer to outer projectile surface 19 than outer projectile surface 21.

Figure 7:
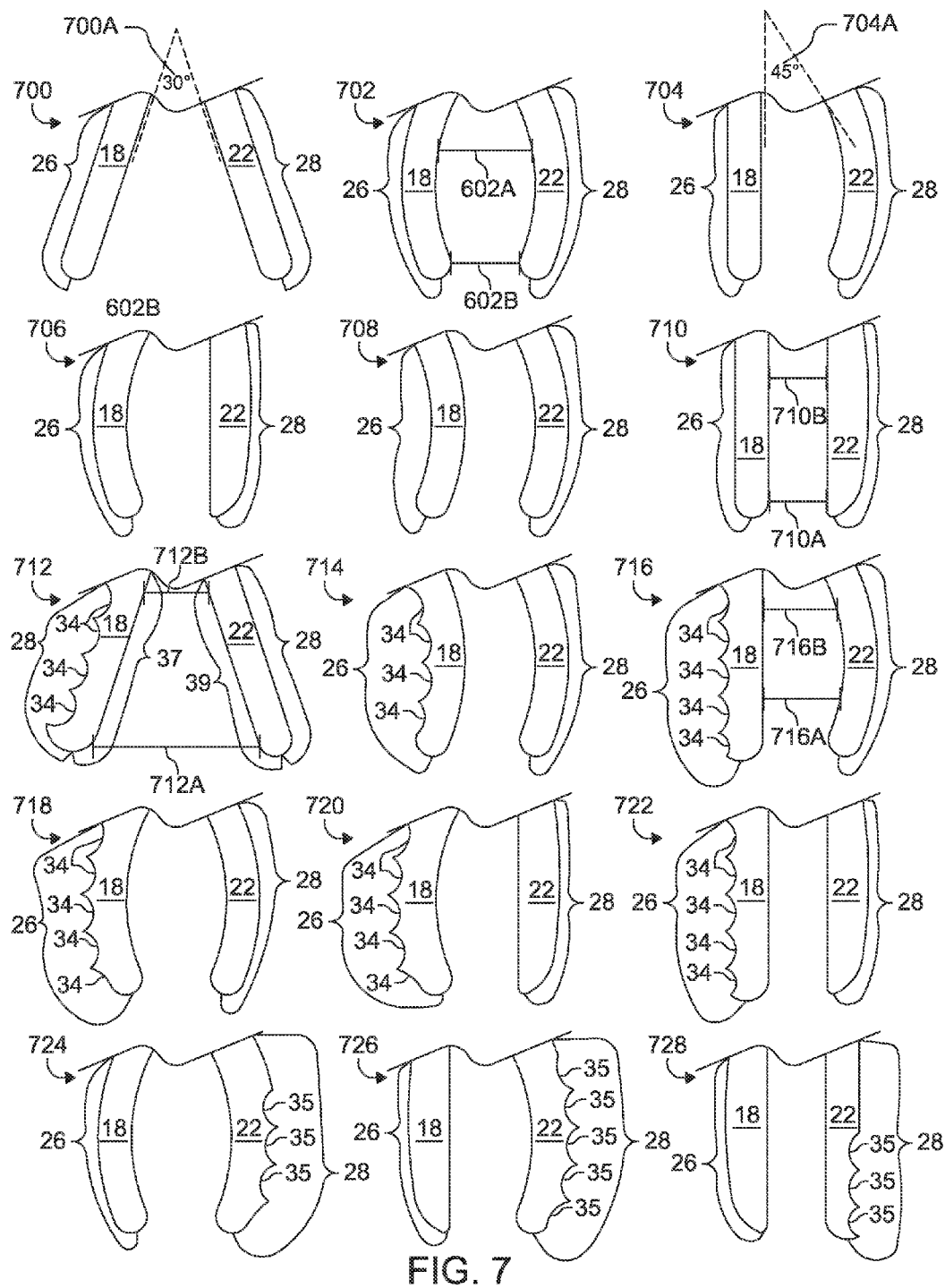
FIG. 7 is a perspective view, showing various configurations of the handle sections of the apparatus.

Referring to FIGS. 1 and 7, arm 12 may include a handle section 18 and a projectile engagement section 20. Handle section 18 may include an outer handle surface 26 and an inner handle surface 37. Outer handle surface 26 may include one or a plurality of concave curves 34 that may be shaped to accommodate a convex profile of a finger(s) of an operator (FIG. 1). For example, the outer handle surface 26 may include two, three, four, five, six or seven concave curves 34 that may be shaped to accommodate an operator's convexly profiled fingers. The number, shape and depth by which the concave curves recesses into outer handle surface 26 may vary. Alternatively, at least a portion of the outer handle surface 26 may form a convex curve shaped to accommodate a concave profile of a palm of an operator (FIG. 7, 702, 706, 724). For example, the entire outer handle surface 26 may be convexly curved to accommodate an operator's concavely profiled palm. The shape, length and width by which the convex curve runs along and protrudes from outer handle surface 26 may vary.

Arm 14 may include a handle section 22 and a projectile engagement section 24. The handle section 22 may include an outer handle surface 28 and an inner handle surface 39. At least a portion of the outer handle surface 28 may form a convex curve 36 shaped to accommodate a concave profile of a palm of an operator (FIG. 1). For example, the entire outer handle surface 28 may be convexly curved 36. The shape, length and width by which the convex curve runs along and protrudes from outer handle surface 28 may vary. Alternatively, outer handle surface 28 may include one or a plurality of concave curves 35 that may be shaped to accommodate a convex profile of a finger(s) of an operator (FIG. 7, 724, 726, 728). For example, outer handle surface 28 may include two, three, four, five, six or seven concave curves that may be shaped to accommodate an operator's convexly profiled fingers. The number, shape and depth by which the concave curves recesses into outer handle surface 28 may vary.

In the instance where instrument 10 contains a plurality of concave curves 34, 35 (for example, seven), such may allow an operator to position and/or re-position his/her fingers before and during operation. The operator may also flip instrument 10 over and use it interchangeably with both hands at any time before and during operation. The convex curves configured to accommodate an operator's concavely profiled palm as well as the concave curves configured to accommodate an operator's convexly profiled finger(s), may increase an operator's ergonomic comfort, handling and leverage when using instrument 10; increase instrument's 10 ability to engage projectiles 52; increase the number of projectiles 52 an operator may engage during a specific period of time; increase the different sizes, dimensions, types, kinds and calibers of projectiles 52 an operator may engage; and/or increase instrument's 10 durability, strength and safety.

Referring to FIGS. 1 and 7, inner handle surface 37 may substantially face inner handle surface 39. Handle section 18 (including without limitation, outer handle surface 26 and inner handle surface 37) and may be separated from handle section 22 (including without limitation, outer handle surface 28 and inner handle surface 39) by various distances, shapes, angles and/or any combination of the same (FIG. 7), which versatility may increase an operator's ergonomic comfort, handling, leverage and effectiveness when using instrument 10. For example, handle section 18 may be substantially straight 704, 710, 716, 722, 728, angled 700, 712, concavely shaped 708, 714 and/or convexly shaped 702, 706, 718, 720, 724. In another instance, outer handle surface 26 may contain a concave curve(s) 34 (such as 712, 714, 716, 718, 720, and 722) and/or a convex curve(s) 706, 702 to accommodate an operator's fingers and/or palm respectively, and/or a combination of both concave and convex curves 718, 720 or neither 700, 704, 710, 726, 728.

In another example, handle section 22 may be substantially straight 706, 710, 720, 722, angled 700, 712, concavely shaped and/or convexly shaped 702, 704, 708, 714, 716, 718. In another instance, outer handle surface 28 may contain a concave curve(s) 35 (such as 724, 726, 728) and/or a convex curve 702, 704, 708, 714, 716, 718 to accommodate an operator's fingers and/or palm respectively, and/or a combination of both concave and convex curves 724, 726 or neither 700, 706, 710, 712, 722.

In another example, the angle 700A, 704A between handle section 18 and handle section 22 may be 30 degrees 700A or 45 degrees 704A.

The distance between handle section 18 and handle section 22 may varied within a particular implementations. For example, the distance between the portion of handle section 18 and handle section 22 configured closest to head 16, may be less than 712, 712A, 712B, greater than and/or equal to 710, 710A, 710B the distance between the portion of handle section 18 and handle section 22 configured furthest from head 16; and such distances may remain the same 710, 710A, 710B, increase 712, 712A, 712B or decrease and/or any combination thereof 716, 716A, 716B when running along handle section 18 and handle section 22.

Referring to FIGS. 1, 2, 3, 5, 12 and 13, projectile engagement section 20 may include an outer projectile surface 19 and an inner projectile surface 40. Projectile engagement section 24 may include an outer projectile surface 21 and an inner projectile surface 42. Inner projectile surface 40 may substantially face inner projectile surface 42. Inner projectile surface 40 and inner projectile surface 42 may be separated by a channel 30. The width 1200, 1202, 1204, 1206 (FIG. 12), length 1300, 1302 (FIG. 13) and height of the channel 30 may vary and/or remain constant as is it runs from the ends of inner projectile surface 40 and inner projectile surface 42 which may be configured furthest from head 16, towards the ends of the inner projectile surface 40 and inner projectile surface 42 which may be configured closest to head 16. For example, the width 1200 of channel 30 at a point configured closer to head 16 on one embodiment of instrument 10, may be wider than width 1202 of channel 30 at a point configured further from head 16 on that same embodiment of instrument 10. In another instance, the width 1206 of channel 30 at a point configured closer to head 16 on one embodiment of instrument 10, may be wider than width 1204 of channel 30 at a point configured further from head 16 on that same embodiment of instrument 10. In another instance, length 1300 of channel 30 on one embodiment of instrument 10 may be longer than length 1302 of channel 30 on a different embodiment of instrument 10. The width, length and height of channel 30 may be configured to accommodate different caliber sizes, types and kinds of projectiles 52. Such may increase instrument's 10 ability to engage projectiles 52; increase the number of projectiles 52 an operator may engage during a specific period of time; increase the different sizes, dimensions, types, kinds and calibers of projectiles 52 an operator may engage; increase instrument's 10 durability, strength and safety; and/or decrease damage done to projectiles 52 when using instrument 10 to engage projectiles 52.

Figure 20:
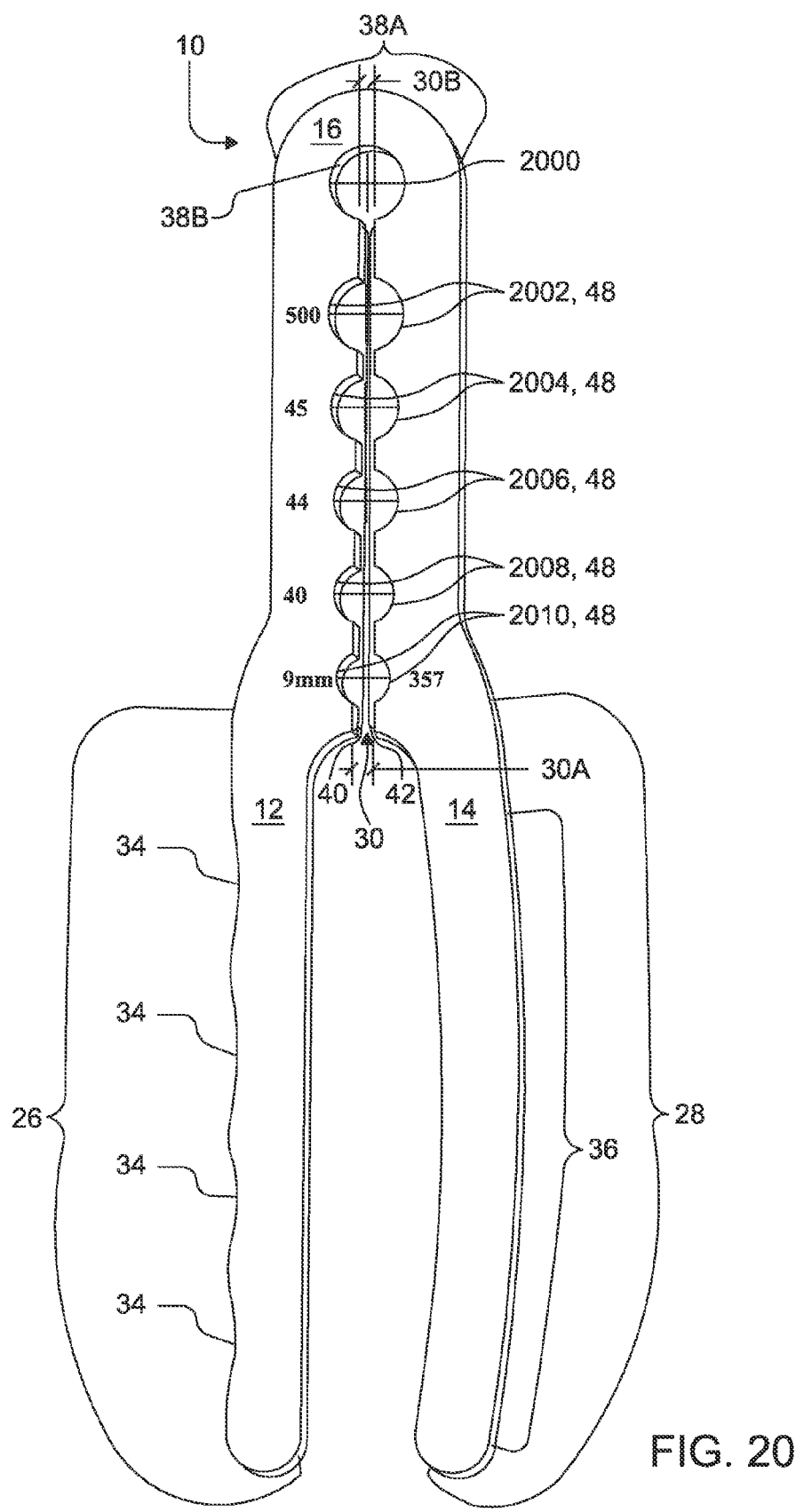
FIG. 20 is a perspective view, showing another embodiment of the apparatus.

Referring to FIGS. 2, 3, 5 and 14, inner projectile surface 40 may include an engagement feature 44 of a particular diameter or a plurality of engagement features 44 of different (FIG. 20) and/or the same diameters. Inner projectile surface 42 may include an engagement feature 46 of a particular diameter or a plurality of different (FIG. 20) and/or the same diameters. Each engagement feature 44, 46 may form a variety of shapes. For example, each engagement feature 44, 46, may for shapes (FIG. 14) that are substantially a semi-circle 1400, semi-oval 1402, semi-square 1404, semi-rectangle 1406, semi-diamond 1408, semi-hexagon 1410, semi-octagon 1412, semi-decagon 1414 or other shape and/or combinations of shapes. The number, shape and diameter of each engagement feature 44, 46 may vary. Such may increase instrument's 10 ability to engage projectiles 52; increase the number of projectiles 52 an operator may engage during a specific period of time; increase the different sizes, dimensions, types, kinds and calibers of projectiles 52 an operator may engage; increase instrument's 10 durability, strength and safety; and/or decrease damage done to projectiles 52 when using instrument 10 to engage projectiles 52.

Referring to FIGS. 2, 15 and 16, the surface and/or edge of each engagement feature 44, 46 may be configured (including without limitation altered and treated) in a variety of ways, textures and shapes. For example, the surface and/or edge of each engagement feature 44, 46 may be configured to substantially be knobbed 1500, vertically serrated 1502, horizontally serrated 1504, pitted or blasted 1506, spiked 1508, smoothed 1510, rounded or bumped 1512. In another instance, the surface and/or edge of each engagement feature 44, 46 may be configured to be lined and/or fitted with or without material 74 such as rubber or plastic inserts (FIGS. 15 and 16). Such may increase instrument's 10 ability to engage projectiles 52; increase the number of projectiles 52 an operator may engage during a specific period of time; increase the different sizes, dimensions, types, kinds and calibers of projectiles 52 an operator may engage; increase instrument's 10 durability, strength and safety; and/or decrease damage done to projectiles 52 when using instrument 10 to engage projectiles 52.

Referring to FIGS. 2, 3, 4, 5 and 14, each engagement feature 44 on inner projectile surface 40 may be opposite an engagement feature 46 on inner projectile surface 42, and each two oppositely situated engagement features 44, 46 may form a pair 48. Each pair 48, when compressed together, may form or otherwise create a variety of shapes. For example, each pair 48, when compressed together, may form shapes (FIG. 14) that are substantially a circumference, circle 1400, oval 1402, square 1404, rectangle 1406, diamond 1408, hexagon 1410, octagon 1412, decagon 1414 or other shapes and/or combinations of shapes. Such may increase instrument's 10 ability to engage projectiles 52; increase the number of projectiles 52 an operator may engage during a specific period of time; increase the different sizes, dimensions, types, kinds and calibers of projectiles 52 an operator may engage; increase instrument's 10 durability, strength and safety; and/or decrease damage done to projectiles 52 when using instrument 10 to engage projectiles 52.

Figure 17:
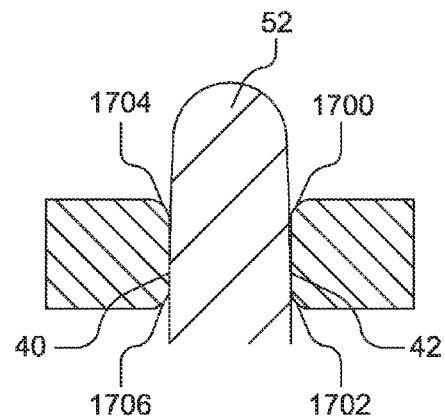
FIG. 17 is a cross-sectional view, showing a pair of engagement features (in the projectile engagement sections of the apparatus) with rounded edges and engaging a projectile.

Referring to FIGS. 4, 16 and 17, each pair 48, when compressed together, may be configured to directly engage a projectile 52 (FIGS. 4 and 17). Each pair 48, when compressed together, may be configured to indirectly engage a projectile 52 (FIG. 16). For example, if a pair 48 of engagement features 44, 46 are fitted with plastic inserts, the pair 48 (FIG. 16) of engagement features 44, 46 may indirectly engage the projectile 52 via the plastic inserts. The diameter of a projectile 52 directly or indirectly which may be engaged by instrument 10, may be slightly smaller than the diameter of the pair 48 of engagement features 44, 46 compressed together and intended to engage that particular projectile 52. The edges 1700, 1702, 1704, 1706 of inner projectile surface 40 and inner projectile surface 42 may be rounded.

Figure 18:
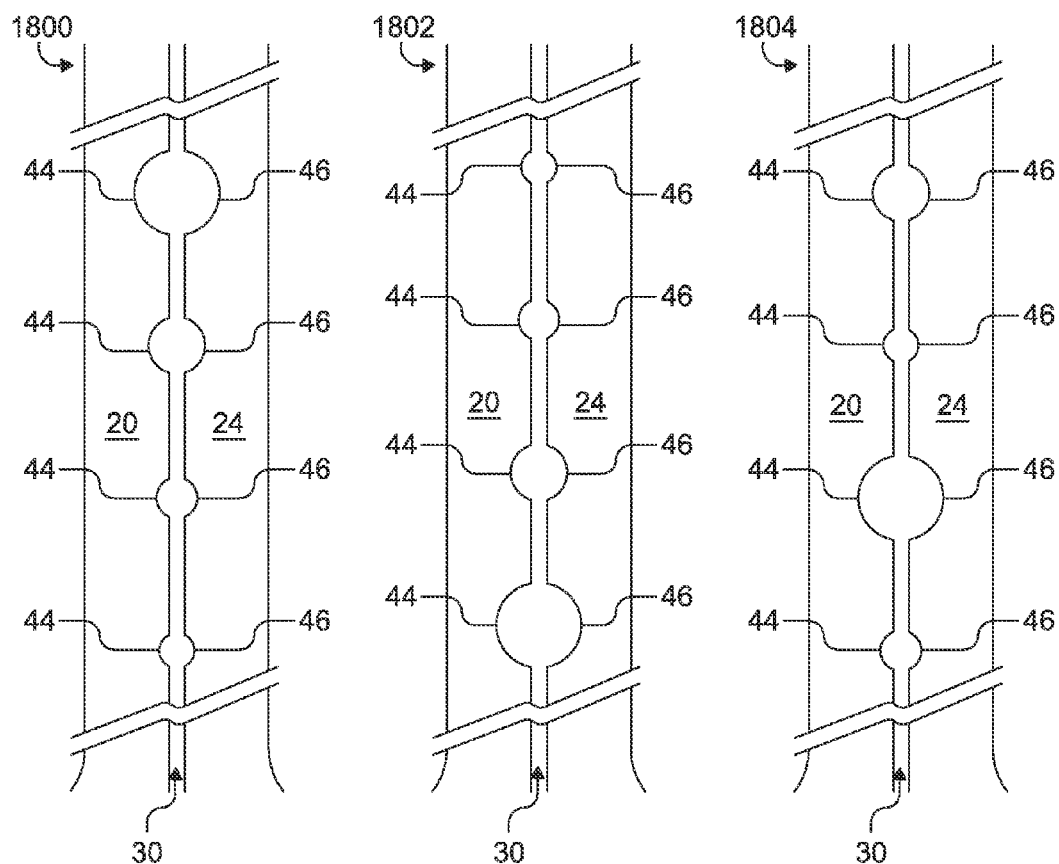
FIG. 18 is a perspective view, showing pairs of engagement features (in the projectile engagement sections of the apparatus) arranged in ascending, descending and random order.

Referring to FIGS. 4, 18, a plurality of pairs 48 of engagement features 44, 46 may be arranged in descending 1800, ascending 1802, random 1804, alternating or other order (FIG. 18). Such may increase an operator's ergonomic comfort, handling and leverage when using instrument 10; increase instrument's 10 ability to engage projectiles 52; increase the number of projectiles 52 an operator may engage during a specific period of time; increase the different sizes, dimensions, types, kinds and calibers of projectiles 52 an operator may engage; increase instrument's 10 durability, strength and safety; and/or decrease damage done to projectiles 52 when using instrument 10 to engage projectiles 52. For example, a plurality of pairs 48 may include at least a first pair 62 and a last pair 64 (FIG. 4). The last pair 64 may have the largest diameter of the pairs 48 and may be configured closest to head 16. The first pair 62 may have the smallest diameter of the pairs 48 and may be configured furthest from head 16. In another example, the first pair 62 may have the largest diameter of the pairs 48 located furthest from head 16 and the last pair 64 may have the smallest diameter of the pairs closest to head 16.

Referring to FIGS. 2 and 4, one or more projectile caliber sizes and/or types may be identified 66 on instrument 10 next to one or more of the pairs 48 of engagement features 44, 46 intended to engage a projectile of that particular caliber and/or type identified 66. Such may reduce the time an operator takes to engage a large number of different projectiles, as the intended caliber and/or type are identified on instrument 10 and easily viewable by an operator.

Instrument 10 may or may not contain removable or interchangeable parts and require or not require retooling and/or changing out different accessories. Instrument 10 may be designed and formed to be simple to use. Such may simplify instrument's 10 use; increase instrument's 10 durability, strength and safety; decrease manufacturing time and costs; and/or decrease the sales price to purchasers.

Figure 6:
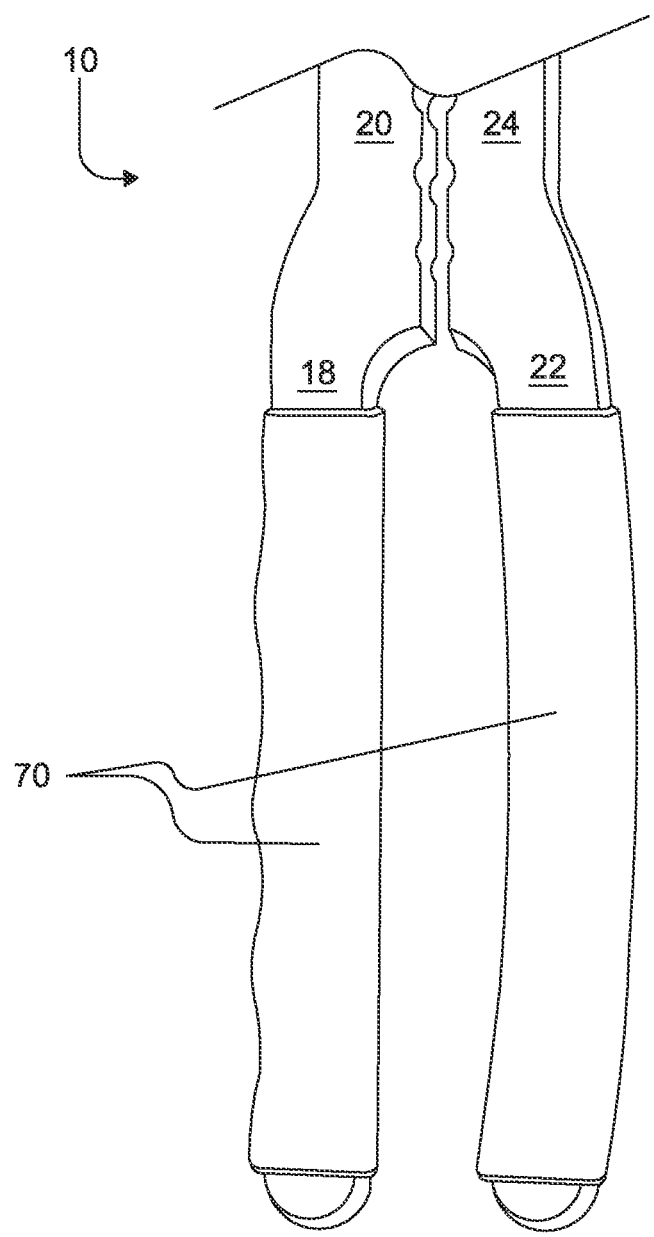
FIG. 6 is a perspective view, showing handle sections of the apparatus covered by material.

Referring to FIG. 6, handle section 18 and handle section 22 may be covered 70 by a variety of material(s). For example, material(s) may include rubber and/or plastic. Coverings 70 may increase an operator's ergonomic comfort, handling and leverage when using instrument 10; increase instrument's 10 ability to engage projectiles 52; increase the number of projectiles 52 an operator may engage during a specific period of time; increase the different sizes, dimensions, types, kinds and calibers of projectiles 52 an operator may engage; increase instrument's 10 durability, strength and safety; and/or decrease damage done to projectiles 52 when using instrument 10 to engage projectiles 52.

Figure 23:
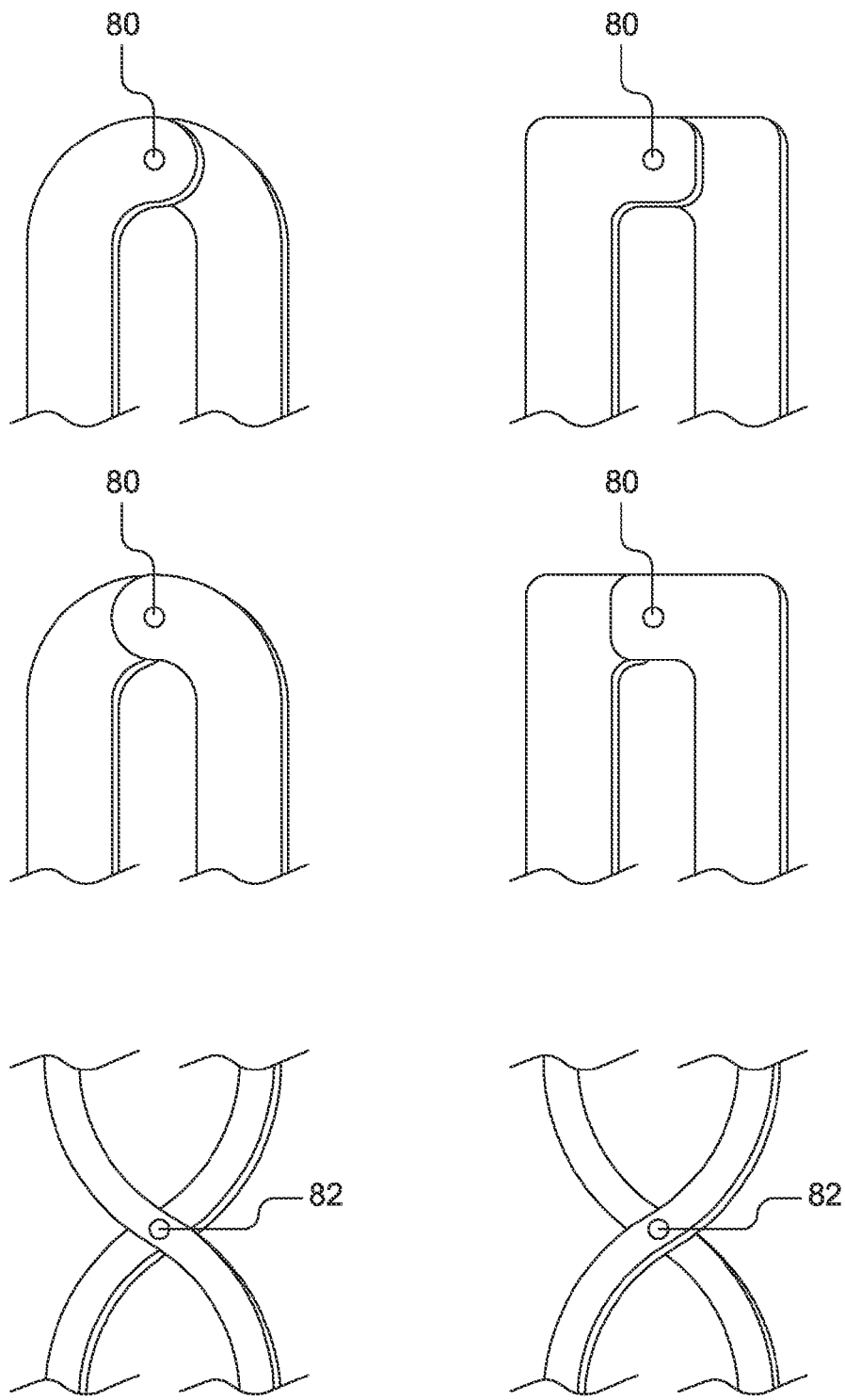
FIG. 23 is a perspective view, showing a variety of embodiments of the apparatus configured with a hinge and a pivot.

Referring to FIG. 23, head 16 of instrument 10 may be replaced by a pivot 82 or a hinge 80.

Instrument 10 and each and every component and feature of instrument 10 (whether expressly stated herein or not), may be configured and manufactured to be a variety of shapes, sizes, dimensions, lengths, widths, heights, angles, textures, surfaces, edges, configurations, from a variety of materials, for any reason or purpose, and any combinations of such. For example, referring to FIGS. 1-23 and 34-36, any configuration of head 16 (which includes, without limitation, configurations of all parts of outer surface 38A and inner surface 38B) may be combined with any configuration of project engagement sections 20, 24 (which include, without limitation, configurations of all parts of outer projectile surfaces 19, 21, inner projectile surfaces 40, 42, and engagement features 44, 46) and/or any configuration of handle sections 18, 22 (which include, without limitation, configurations of all parts of outer handle sections 26, 28 and inner handle sections 37, 39), and/or vice versa.

Figure 29:
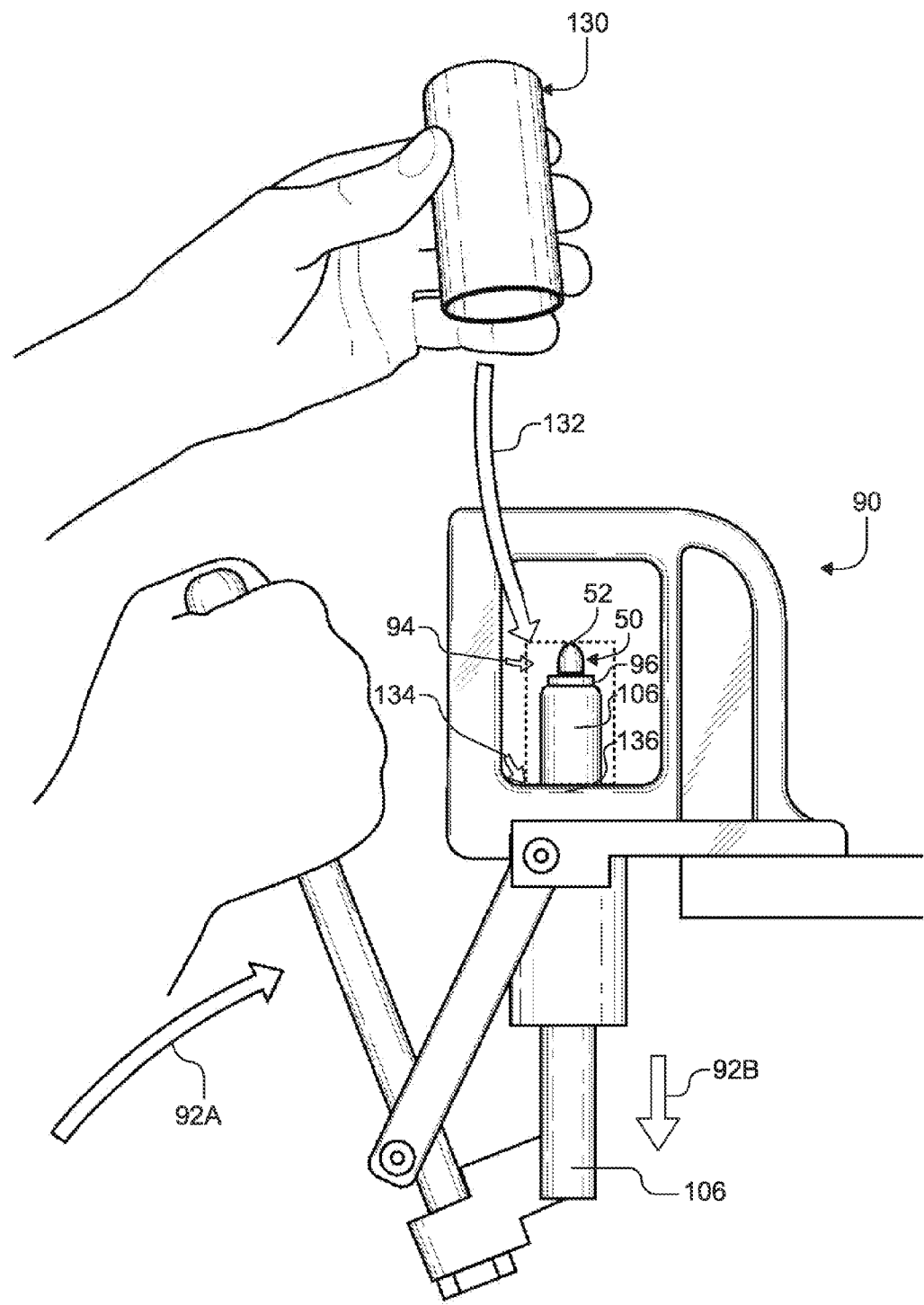
FIG. 29 is a side evaluation of a conventional reloading press, showing the reloading press containing a cartridge and being actuated into loading position, as well as a tube structure being loaded into position above the cartridge on the reloading press.
Figure 30:
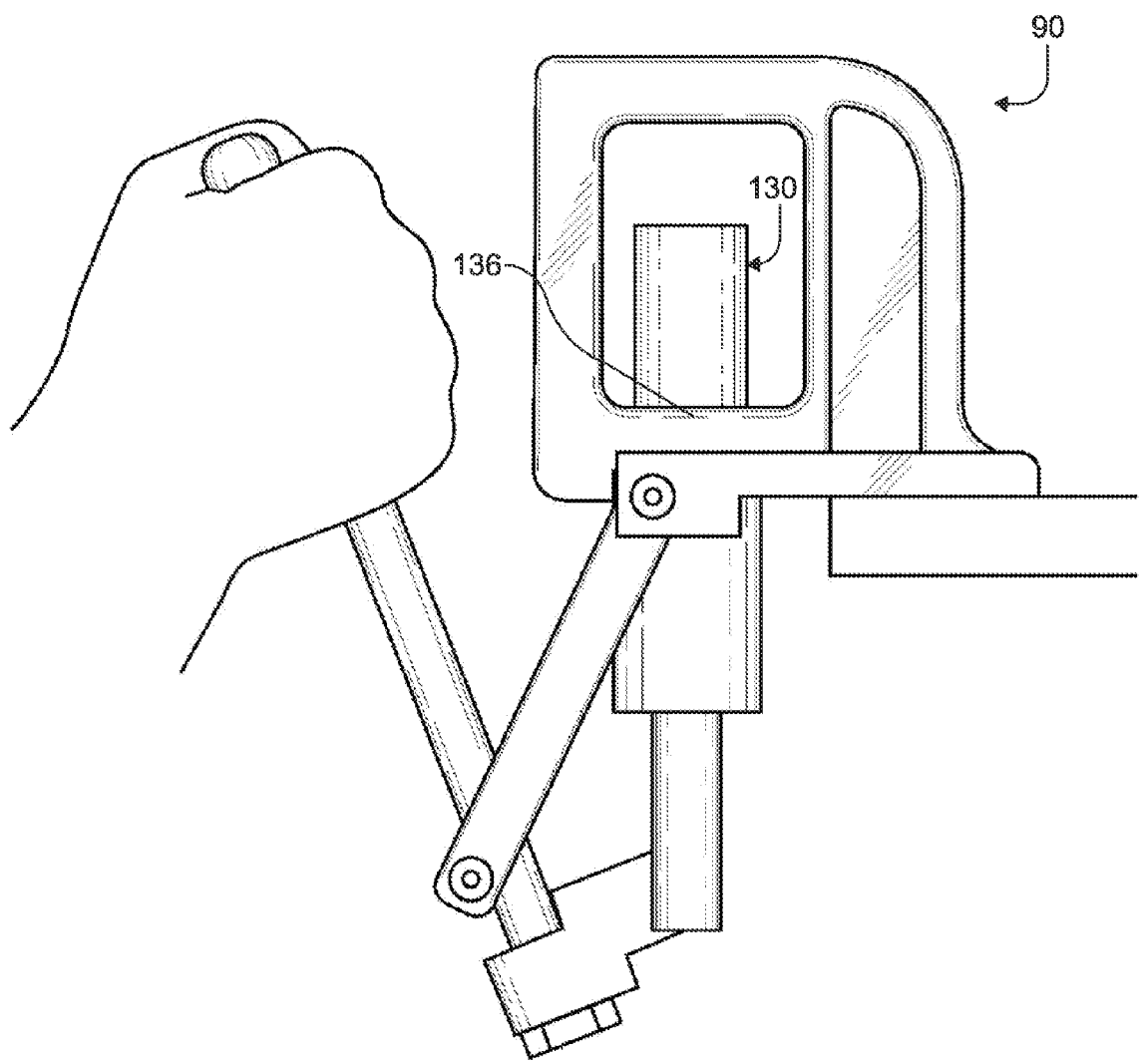
FIG. 30 is a side evaluation of a conventional reloading press, showing the reloading press in loading position with a tube structure placed over the cartridge and onto the base of the reloading press and around the ram of the reloading press.

Referring to FIGS. 29 and 30, tube structure 130 may be used in conjunction with instrument 10 and reloading press 90 in order to facilitate the engagement and removal of certain projectiles 52. Tube structure 130 may be long enough and wide enough to fit over cartridge 50, onto 134 base 136 of reloading press 90 and around ram 106 so that ram 106 can freely articulate through tube structure 130 without moving it 130. Tube structure 130 may be formed from a variety of materials. For example, materials may include metals such as aluminum, copper, iron, tin, gold, lead, silver, titanium, uranium, and zinc; alloys such as stainless steel, steel (iron and carbon), brass (copper and zinc), bronze (copper and tin), duralumin (aluminum and copper) and gunmetal (copper, tin, and zinc); non-metals; other materials; and/or composites such as fiberglass, plastic, polyvinyl chloride (PVC), wood, carbon fiber, and polyether ether ketone (PEEK); and/or any material instrument 10 is composed of In a particular implementation, referring to FIG. 20, instrument 10 includes an arm 12, an arm 14 and a head 16. Instrument 10 is formed by cutting it 10 from a single ¼ inch thick piece of stainless steel. Instrument 10 is 9¼ inches in length.

Head 16 includes an outer surface 38A and an inner surface 38B. Outer surface 38A forms a shape that is substantially a semi-circle. The width of outer surface 38A is 1¼ inches. Inner surface 38B forms a shape that is substantially a circle with a diameter 2000 of 0.5 inches.

Outer handle surface 28 forms a convex curve 36 to accommodate an operator's concavely profiled palm.

Outer handle surface 26 includes four concave curves 34 that are shaped to accommodate an operator's convexly profiled fingers.

The total width measuring from outer handle surface 26 to outer handle surface 28 is 1 and 15/16 inches.

The width of channel 30 is 0.16 inches from end 30A, which is configured furthest from head 16, and gradually narrows to 0.1 inches as channel 30 runs towards end 30B, which is configured closest to head 16.

Inner projectile surface 40 includes five different diameter sized engagement features. Inner projectile surface 42 includes five similarly different diameter sized engagement features. Each engagement feature, by itself, forms a shape that is substantially a semi-circle. The surface of each engagement feature is rounded on the edges (FIG. 17).

Each engagement feature on inner projectile surface 40 is opposite one similarly diameter sized engagement feature on inner projectile surface 42, and two oppositely situated engagement features form a pair, there being five pairs in total. Each pair, when compressed together, forms or otherwise creates the shape of a circular circumference that engages a projectile, wherein the diameter of the projectile intended to be engaged is slightly smaller than the diameter of the pair of engagement features configured to engage that particular projectile, when said pairs are compressed together.

The five pairs are arranged in descending order, with the fifth pair 2002 being situated closest to head 16 and having the largest diameter of the five pairs, the first pair 2010 being situated furthest from head 16 and having the smallest diameter of the five pairs, and the diameters of the fourth pair 2004, third pair 2006 and second pair 2008 getting progressively smaller as they move further from head 16.

The fifth pair 2002 of engagement features have a diameter of 0.501 inches (0.500 inches in another embodiment) at resting and, when compressed together, are configured to engage projectiles shot from the following pistols: 50 AE and 500 Smith & Wesson magnum. The number 500 is identified on instrument 10 next to the fifth pair 2002 of engagement features.

The fourth pair 2004 of engagement features have a diameter of 0.452 inches at resting and, when compressed together, are configured to engage projectiles shot from a 45 caliber pistol. The number 45 is identified on instrument 10 next to the fourth pair 2004 of engagement features.

The third pair 2006 of engagement features have a diameter of 0.431 inches at resting and, when compressed together, are configured to engage projectiles shot from a 44 caliber pistol. The number 44 is identified on instrument 10 next to the third pair 2006 of engagement features.

The second pair 2008 of engagement features have a diameter of 0.402 inches at resting and, when compressed together, are configured to engage projectiles shot from a 40 caliber pistol. The number 40 is identified on instrument 10 next to the second pair 2008 of engagement features.

The first pair 2010 of engagement features have a diameter of 0.359 inches at resting and, when compressed together, are configured to engage projectiles shot from the following pistols: 9 mm, 357 magnum, 38 special and 380 automatic. The numbers 9 mm and 357 are identified on instrument 10 next to the first pair 2010 of engagement features.

Figure 21:
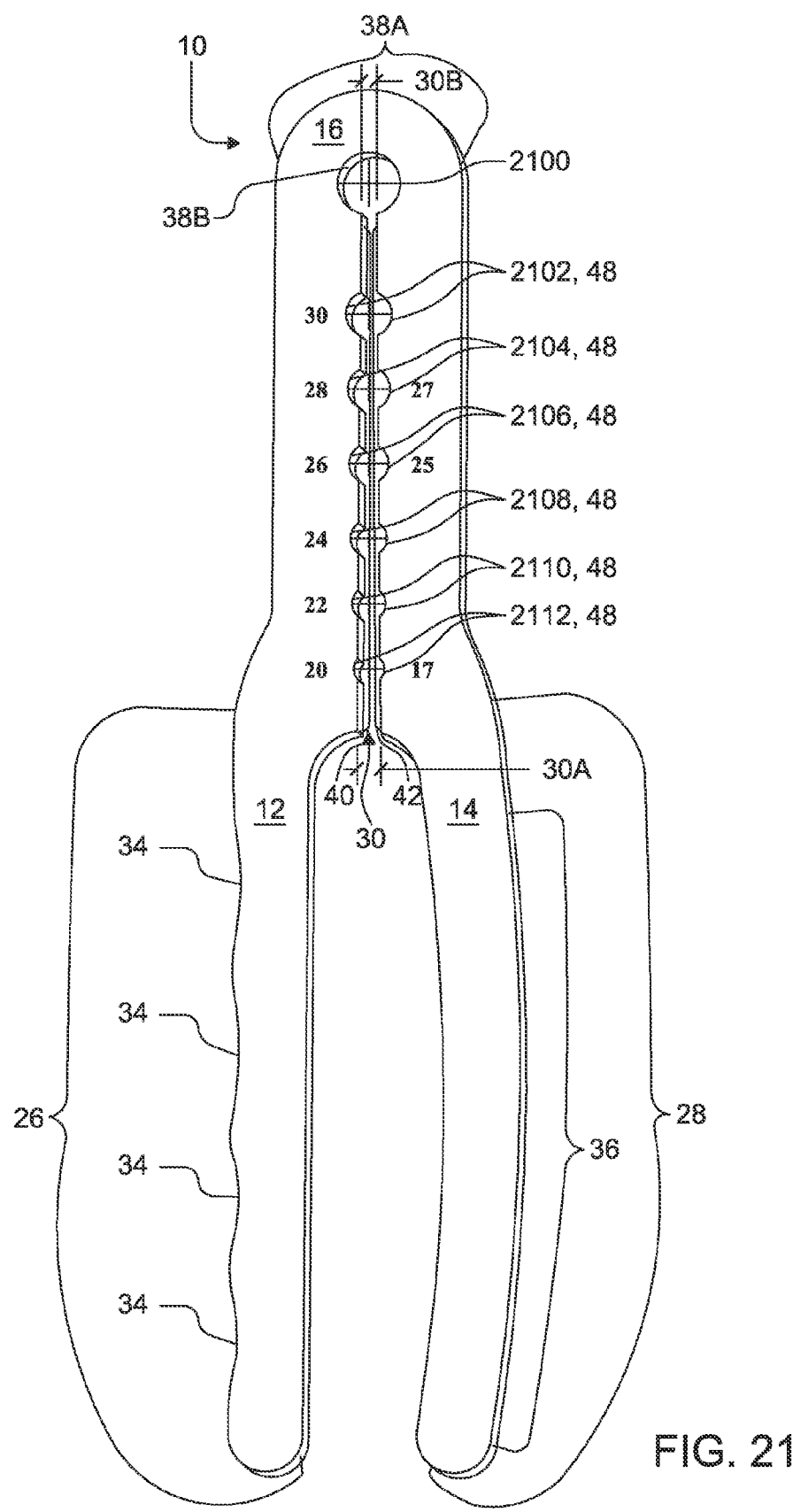
FIG. 21 is a perspective view, showing another embodiment of the apparatus.

In another particular implementation, referring to FIG. 21, instrument 10 includes an arm 12, an arm 14 and a head 16. Instrument 10 is formed by cutting it 10 from a single ¼ inch thick piece of stainless steel. Instrument 10 is 9¼ inches in length.

Head 16 includes an outer surface 38A and an inner surface 38B. Outer surface 38A forms a shape that is substantially a semi-circle. The width of outer surface 38A is 1¼ inches. Inner surface 38B forms a shape that is substantially a circle with a diameter 2100 of 0.4188 inches.

Outer handle surface 28 forms a convex curve 36 to accommodate an operator's concavely profiled palm.

Outer handle surface 26 includes four concave curves 34 that are shaped to accommodate an operator's convexly profiled fingers.

The total width measuring from outer handle surface 26 to outer handle surface 28 is 1 and 15/16 inches.

The width of channel 30 is 0.16 inches from end 30A, which is configured furthest from head 16, and gradually narrows to 0.1 inches as channel 30 runs towards end 30B, which is configured closest to head 16.

Inner projectile surface 40 includes six different diameter sized engagement features. Inner projectile surface 42 includes six similarly different diameter sized engagement features. Each engagement feature, by itself, forms a shape that is substantially a semi-circle. The surface of each engagement feature is rounded on the edges (FIG. 17).

Each engagement feature on inner projectile surface 40 is opposite one similarly diameter sized engagement feature on inner projectile surface 42, and two oppositely situated engagement features form a pair, there being six pairs in total. Each pair, when compressed together, forms or otherwise creates the shape of a circular circumference that engages a projectile, wherein the diameter of the projectile intended to be engaged is slightly smaller than the diameter of the pair of engagement features configured to engage that particular projectile, when said pairs are compressed together.

The six pairs are arranged in descending order, with the sixth pair 2102 being situated closest to head 16 and having the largest diameter of the six pairs, the first pair 2112 being situated furthest from head 16 and having the smallest diameter of the six pairs, and the diameters of the fifth pair 2104, fourth pair 2106, third pair 2108 and second pair 2110 getting progressively smaller as they move further from head 16.

The sixth pair 2102 of engagement features have a diameter of 0.308 inches (0.309 inches in another embodiment) at resting and, when compressed together, are configured to engage projectiles shot from a 30 caliber rifle. The number 30 is identified on instrument 10 next to the sixth pair 2102 of engagement features.

The fifth pair 2104 of engagement features have a diameter of 0.285 inches at resting and, when compressed together, are configured to engage projectiles shot from 28 and 27 caliber rifle. The numbers 28 and 27 are identified on instrument 10 next to the fifth pair 2104 of engagement features.

The fourth pair 2106 of engagement features have a diameter of 0.265 inches at resting and, when compressed together, are configured to engage projectiles shot from a 26 caliber rifle. The numbers 26 and 25 are identified on instrument 10 next to the fourth pair 2106 of engagement features.

The third pair 2108 of engagement features have a diameter of 0.244 inches at resting and, when compressed together, are configured to engage projectiles shot from a 24 caliber rifle. The number 24 is identified on instrument 10 next to the third pair 2108 of engagement features.

The second pair 2110 of engagement features have a diameter of 0.225 inches at resting and, when compressed together, are configured to engage projectiles shot from a 22 caliber rifle. The number 22 is identified on instrument 10 next to the second pair 2110 of engagement features.

The first pair 2112 of engagement features have a diameter of 0.205 inches at resting and, when compressed together, are configured to engage projectiles shot from 20 and 17 caliber rifles. The numbers 20 and 17 are identified on instrument 10 next to the first pair 2112 of engagement features.

Figure 22:
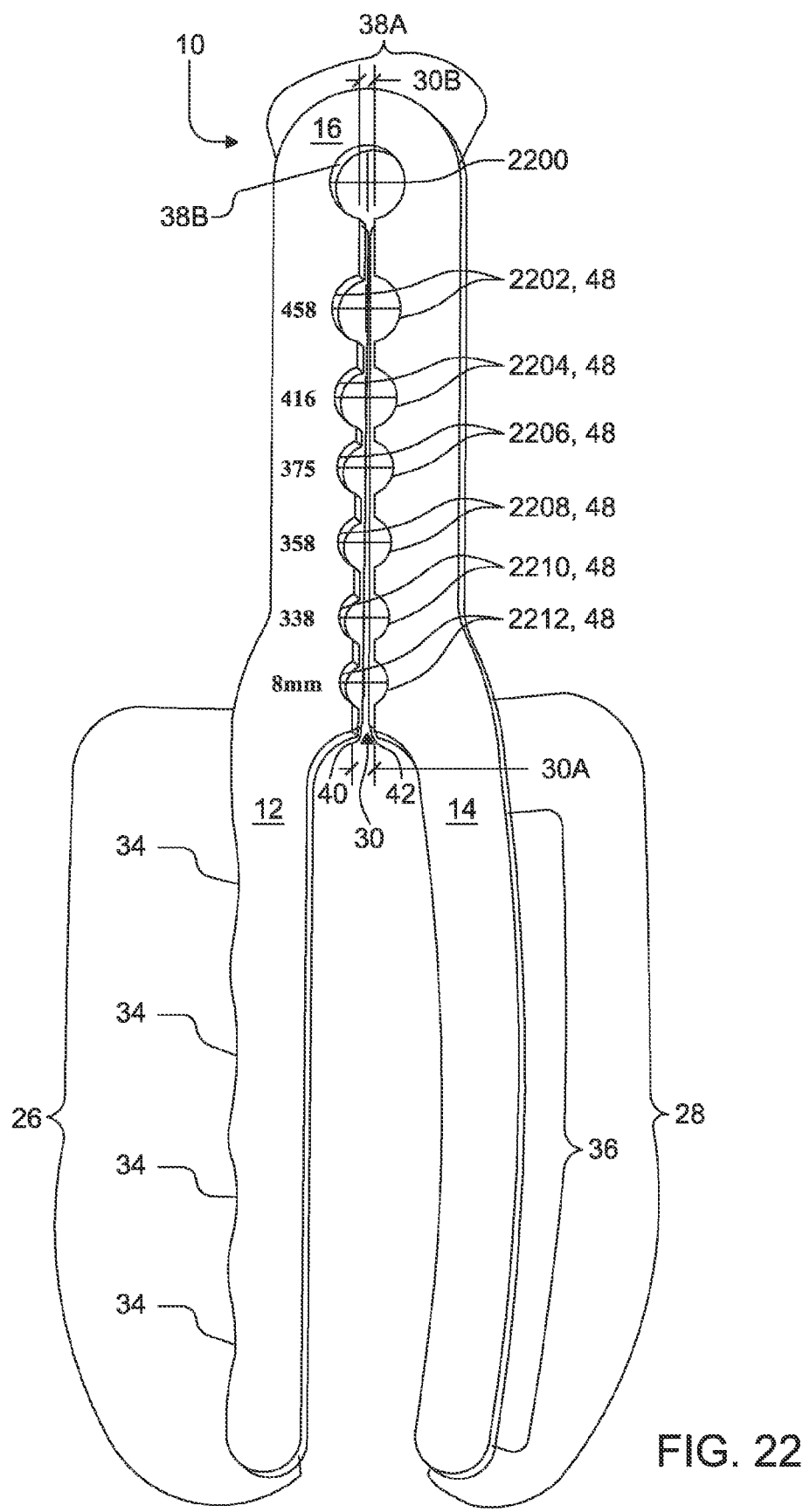
FIG. 22 is a perspective view, showing another embodiment of the apparatus.

In another particular implementation, referring to FIG. 22, instrument 10 includes an arm 12, an arm 14 and a head 16. Instrument 10 is formed by cutting it 10 from a single ¼ inch thick piece of stainless steel. Instrument 10 is 9¼ inches in length.

Head 16 includes an outer surface 38A and an inner surface 38B. Outer surface 38A forms a shape that is substantially a semi-circle. The width of the outer surface 38A is 1¼ inches. Inner surface 38B forms a shape that is substantially a circle with a diameter 2200 of inches.

Outer handle surface 28 forms a convex curve 36 to accommodate an operator's concavely profiled palm.

The outer handle surface 26 includes four concave curves 34 that are shaped to accommodate an operator's convexly profiled fingers.

The total width measuring from outer handle surface 26 to outer handle surface 28 is 1 and 15/16 inches.

The width of channel 30 is 0.16 inches from end 30A, which is configured furthest from head 16, and gradually narrows to 0.1 inches as channel 30 runs towards end 30B, which is configured closest to head 16.

Inner projectile surface 40 includes six different diameter sized engagement features. Inner projectile surface 42 includes six similarly different diameter sized engagement features. Each engagement feature, by itself, forms a shape that is substantially a semi-circle. The surface of each engagement feature is rounded on the edges (FIG. 17).

Each engagement feature on inner projectile surface 40 is opposite one similarly diameter sized engagement feature on inner projectile surface 42, and two oppositely situated engagement features form a pair, there being six pairs in total. Each pair, when compressed together, forms or otherwise creates the shape of a circular circumference that engages a projectile, wherein the diameter of the projectile intended to be engaged is slightly smaller than the diameter of the pair of engagement features configured to engage that particular projectile, when said pairs are compressed together.

The six pairs are arranged in descending order, with the sixth pair 2202 being situated closest to head 16 and having the largest diameter of the six pairs, the first pair 2212 being situated furthest from head 16 and having the smallest diameter of the six pairs, and the diameters of the fifth pair 2204, fourth pair 2206, third pair 2208 and second pairs 2210 getting progressively smaller as they move further from head 16.

The sixth pair 2202 of engagement features have a diameter of 0.459 inches at resting and, when compressed together, are configured to engage projectiles shot from a 0.458 caliber rifle. The number 458 is identified on instrument 10 next to the sixth pair 2202 of engagement features.

The fifth pair 2204 of engagement features have a diameter of 0.417 inches at resting and, when compressed together, are configured to engage projectiles shot from a 0.416 caliber rifle. The number 416 is identified on instrument 10 next to the fifth pair 2204 of engagement features.

The fourth pair 2206 of engagement features have a diameter of 0.376 inches at resting and, when compressed together, are configured to engage projectiles shot from a 0.375 caliber rifle. The number 375 is identified on instrument 10 next to the fourth pair 2206 of engagement features.

The third pair 2208 of engagement features have a diameter of 0.359 inches at resting and, when compressed together, are configured to engage projectiles shot from a 0.358 caliber rifle. The number 358 is identified on instrument 10 next to the third pair 2208 of engagement features.

The second pair 2210 of engagement features have a diameter of 0.339 inches (0.338 inches in another embodiment) at resting and, when compressed together, are configured to engage projectiles shot from a 0.338 caliber rifle. The number 338 is identified on instrument 10 next to the second pair 2210 of engagement features.

The first pair 2212 of engagement features have a diameter of 0.324 inches (0.325 inches in another embodiment) at resting and, when compressed together, are configured to engage projectiles shot from a 8 mm caliber rifle. The number 8 mm is identified on instrument 10 next to the first pair 2212 of engagement features.

Figure 22A:
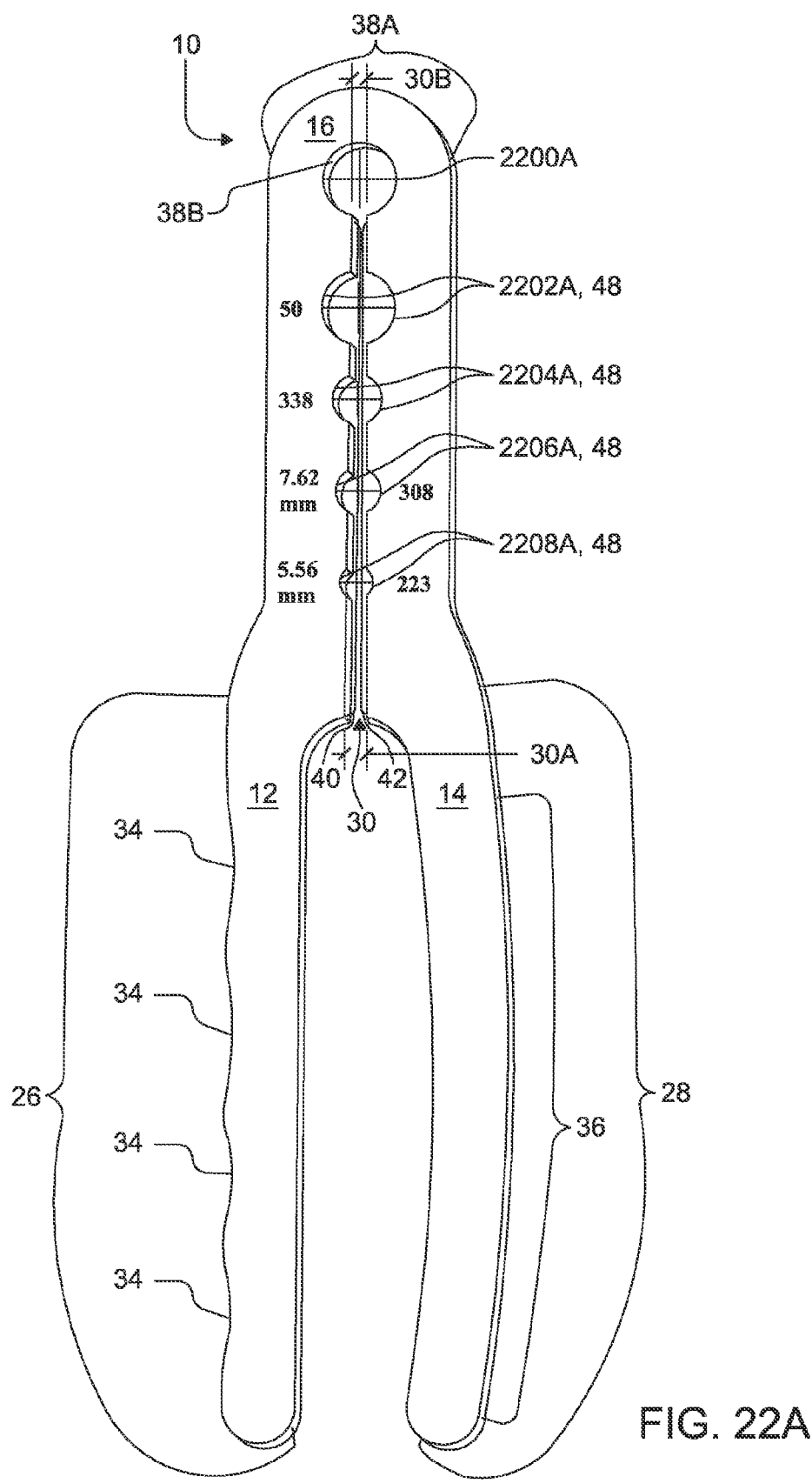
FIG. 22A is a perspective view, showing another embodiment of the apparatus.

In another particular implementation, referring to FIG. 22A, instrument 10 includes an arm 12, an arm 14 and a head 16. Instrument 10 is formed by cutting it 10 from a single ¼ inch thick piece of stainless steel. Instrument 10 is 9¼ inches in length.

Head 16 includes an outer surface 38A and an inner surface 38B. Outer surface 38A forms a shape that is substantially a semi-circle. The width of the outer surface 38A is 1¼ inches. Inner surface 38B forms a shape that is substantially a circle with a diameter 2200A of 0.5 inches.

Outer handle surface 28 forms a convex curve 36 to accommodate an operator's concavely profiled palm.

The outer handle surface 26 includes four concave curves 34 that are shaped to accommodate an operator's convexly profiled fingers.

The total width measuring from outer handle surface 26 to outer handle surface 28 is 1 and 15/16 inches.

The width of channel 30 is 0.16 inches from end 30A, which is configured furthest from head 16, and gradually narrows to 0.1 inches as channel 30 runs towards end 30B, which is configured closest to head 16.

Inner projectile surface 40 includes four different diameter sized engagement features. Inner projectile surface 42 includes four similarly different diameter sized engagement features. Each engagement feature, by itself, forms a shape that is substantially a semi-circle. The surface of each engagement feature is rounded on the edges.

Each engagement feature on inner projectile surface 40 is opposite one similarly diameter sized engagement feature on inner projectile surface 42, and two oppositely situated engagement features form a pair, there being four pairs in total. Each pair, when compressed together, forms or otherwise creates the shape of a circular circumference that engages a projectile, wherein the diameter of the projectile intended to be engaged is slightly smaller than the diameter of the pair of engagement features configured to engage that particular projectile, when said pairs are compressed together.

The four pairs are arranged in descending order, with the fourth pair 2202A being situated closest to head 16 and having the largest diameter of the four pairs, the first pair 2208A being situated furthest from head 16 and having the smallest diameter of the four pairs, and the diameters of the third pair 2204A and second pair 2206A getting progressively smaller as they move further from head 16.

The fourth pair 2202A of engagement features have a diameter of 0.511 inches at resting and, when compressed together, are configured to engage projectiles shot from a 50 BMG caliber gun. The number 50 is identified on instrument 10 next to the fourth pair 2202A of engagement features.

The third pair 2204A of engagement features have a diameter of 0.339 inches at resting and, when compressed together, are configured to engage projectiles shot from a 0.338 caliber gun. The number 338 is identified on instrument 10 next to the third pair 2204A of engagement features.

The second pair 2206A of engagement features have a diameter of 0.309 inches at resting and, when compressed together, are configured to engage projectiles shot from a 0.308 caliber gun and 7.62 mm gun. The numbers 7.62 mm and 308 are identified on instrument 10 next to the second pair 2206A of engagement features.

The first pair 2208A of engagement features have a diameter of 0.225 inches at resting and, when compressed together, are configured to engage projectiles shot from a 0.224 caliber gun and 5.56 mm gun. The numbers 5.56 mm and 223 are identified on instrument 10 next to the first pair 2208A of engagement features.

In another particular implementation, referring to FIGS. 29-33A, a tube structure 130 is included with the purchase of instrument 10. Tube structure 130 is 2.5 inches long and 1.5 to 1.75 inches in diameter and can fit over the cartridge 50, onto 134 the base 136 of reloading press 90 and around ram 106 so that ram 106 can freely articulate through tube structure 130 without moving it 130. Tube structure is made out of aluminum or stainless steel.

Using instrument 10 to engage projectiles 52 may be accomplished by a variety of means and for a variety of reasons and purposes. For example, instrument 10 may be used to engage projectiles in order to and by means of securing, holding, twisting, compressing, removing, extracting, anchoring, stabilizing, manipulating and/or gripping projectiles. Instrument 10 may be used with or without the assistance of additional tools, such as tube structure 130, which designed for engaging small caliber sized projectiles 52, and/or other devises such as reloading press 90. Instrument 10 may be used with either of the operator's hands.

The following is an embodiment of two examples of methods for using instrument 10—one example is using instrument 10 and reloading press 90 to engage and removing projectiles 52 and second example is using instrument 10, reloading press 90 and tube structure 130 for engaging and removing certain small caliber sized projectiles 52.

Figure 24:
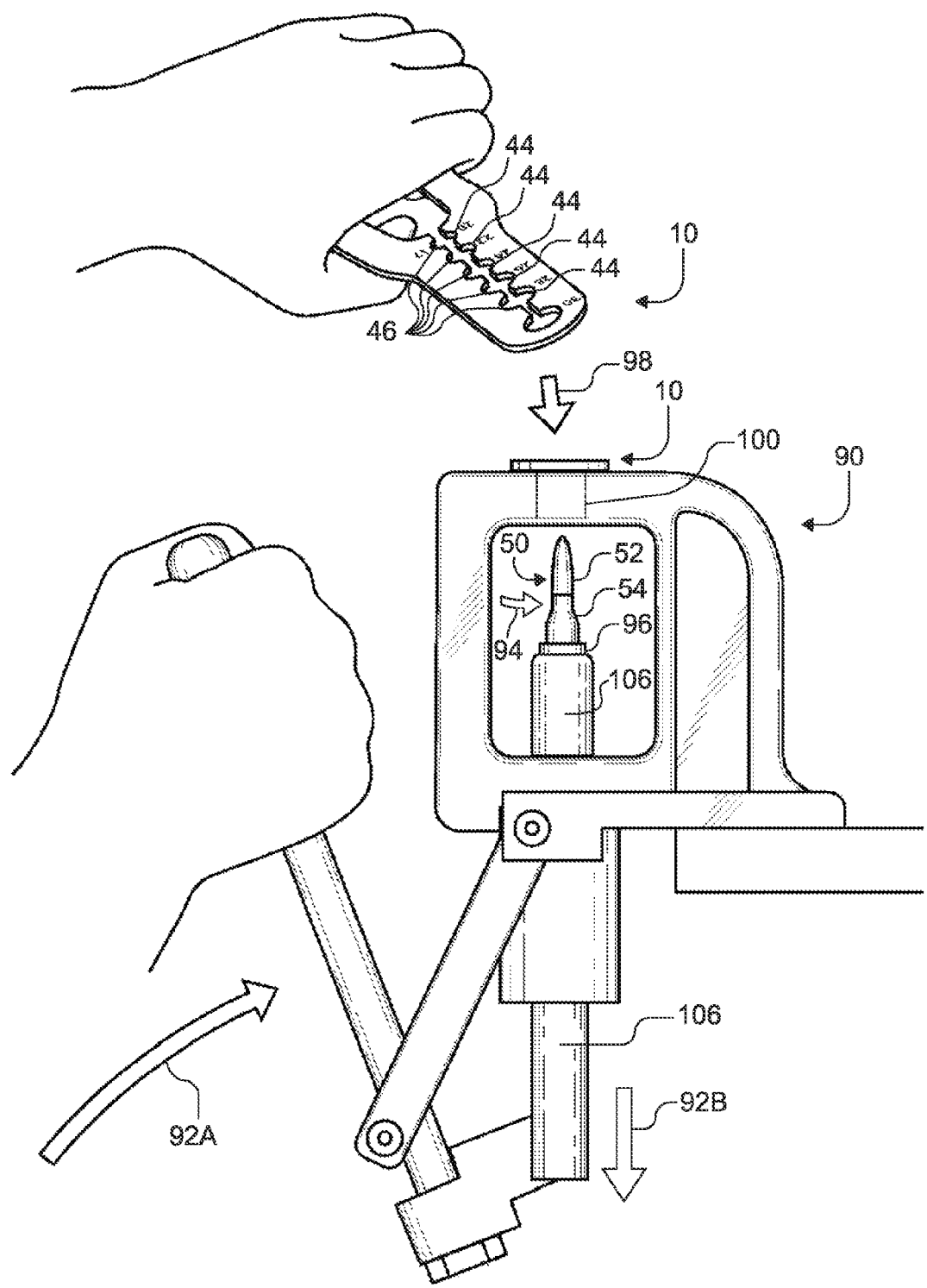
FIG. 24 is a side evaluation of a conventional reloading press, showing the reloading press being actuated into loading position and containing a cartridge and the apparatus being placed adjacent to the reloading press.
Figure 33:
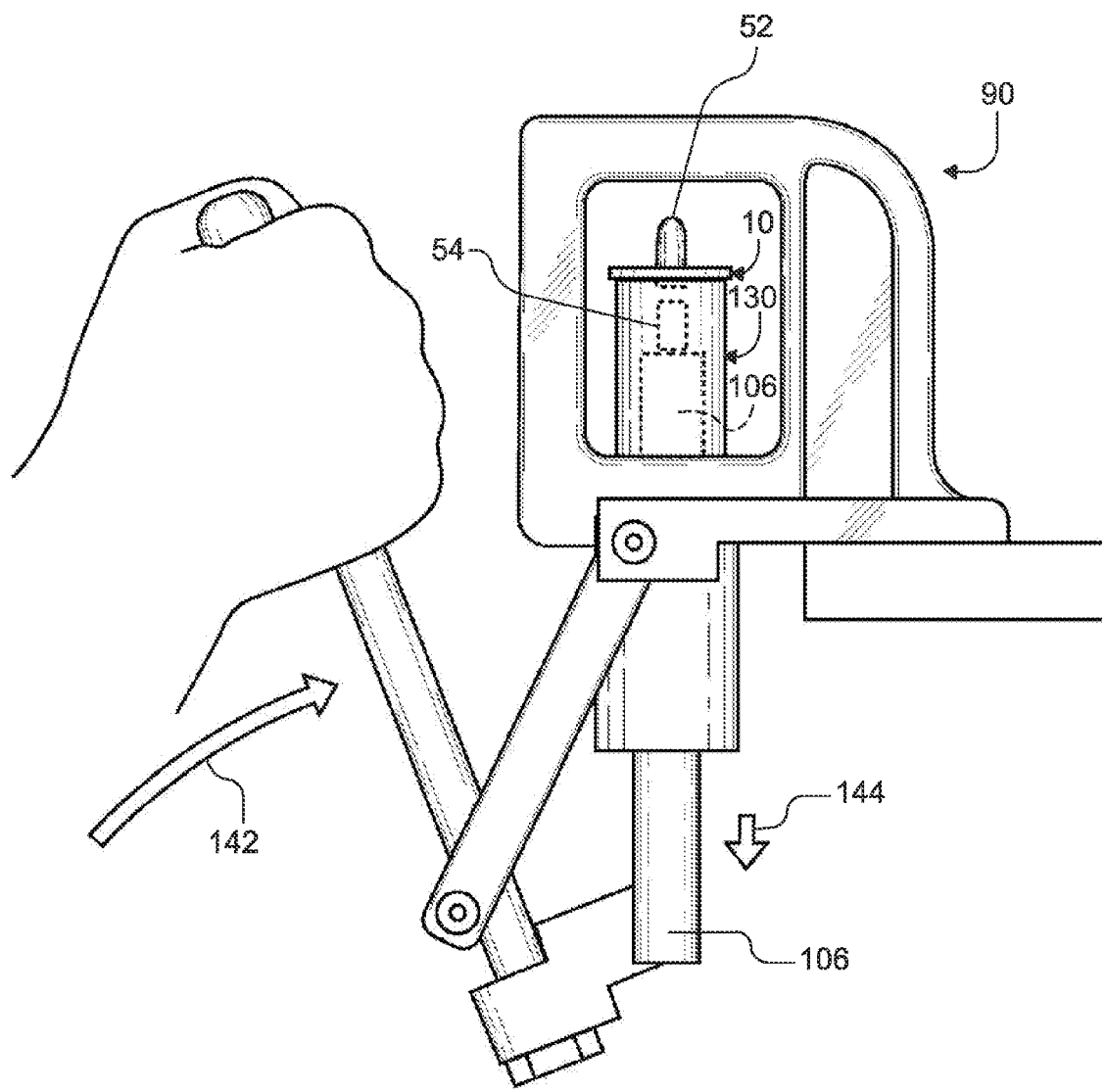
FIG. 33 is a side evaluation of a conventional reloading press, showing the separation of the ram from the apparatus thereby removing the projectile from a casing of the cartridge.
Figure 33A:
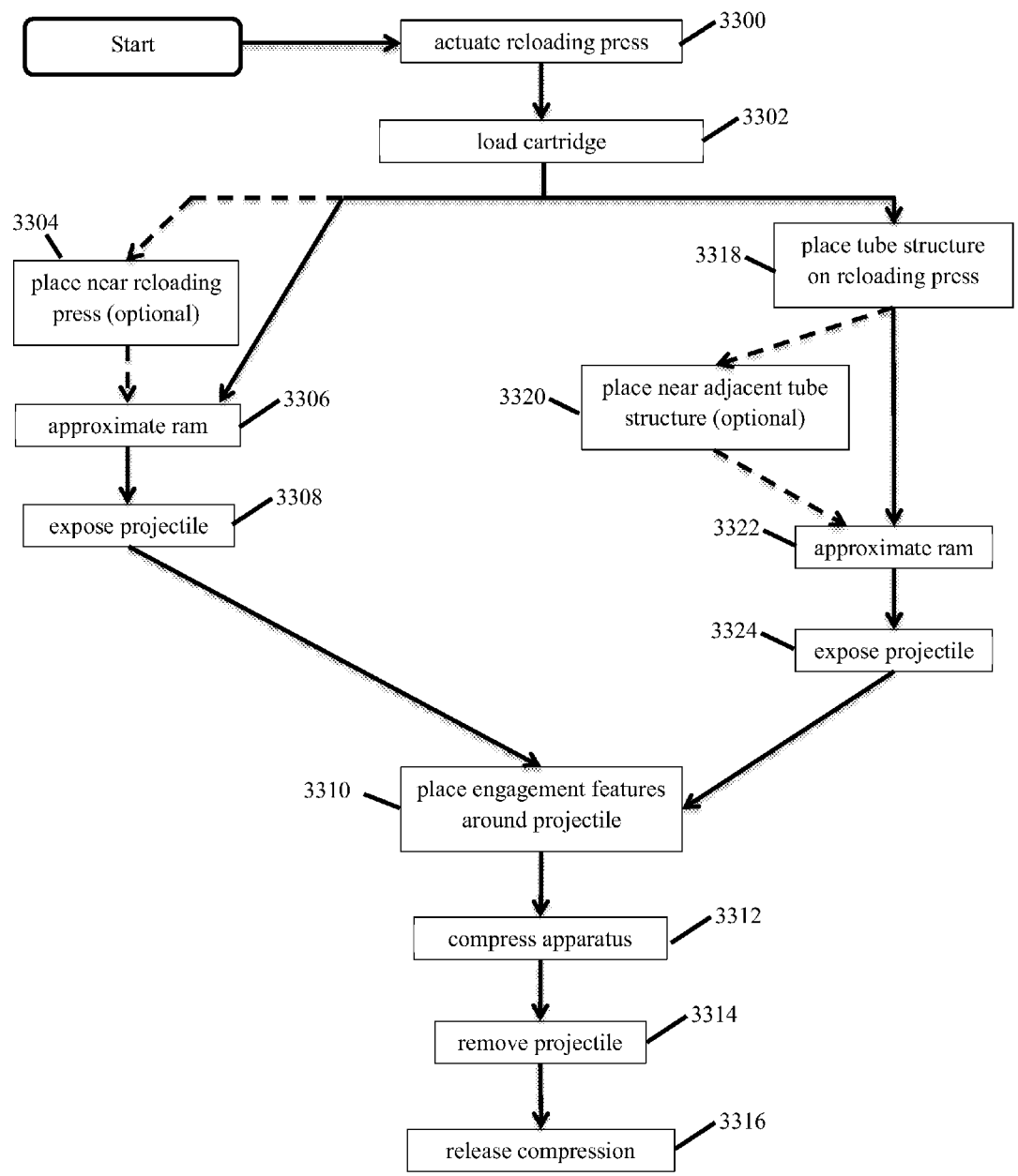
FIG. 33A is a flow chart, showing multiple methods for using the apparatus.

In a particular implementation, referring to FIGS. 24-28 and 33A, removing projectile 52 from casing 54 of cartridge 50 by using instrument 10 and reloading press 90, which use includes the following:

Referring to FIGS. 24 and 33A, at step 3300, an operate actuates 92A a reloading press 90 (and its 90 ram 106) into loading position 92B; at step 3302, an operator loads 94 cartridge 50 containing projectile 52 onto shell holder 96 of reloading press 90; and at optional step 3304, an operator has the option of placing 98 instrument 10 above receiving chamber 100 of reloading press 90 so that a particular caliber sized engagement feature 44 located on inner projectile surface 40 of projectile engagement section 20 of arm 12 and the oppositely situated and similarly caliber sized engagement feature 46 located on inner projectile surface 42 of projectile engagement section 24 of arm 14, are anticipating the approximation of projectile 52 which engagement features 44, 46 are configured to engage.

Figure 25:
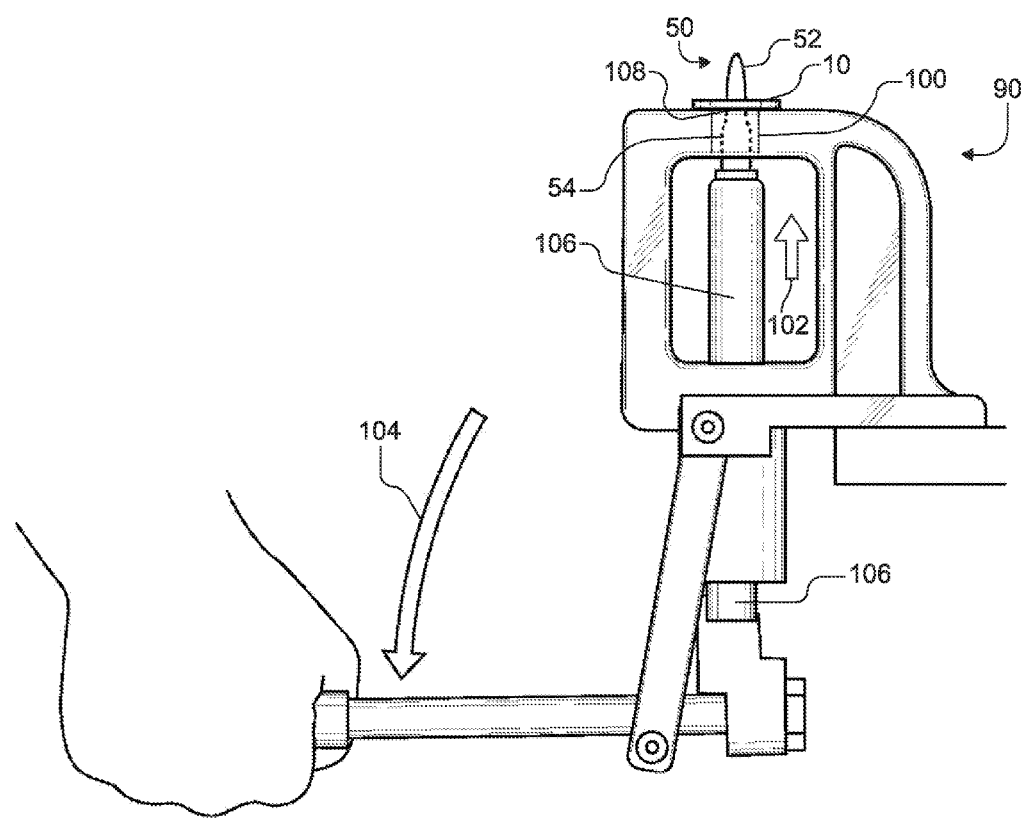
FIG. 25 is a side evaluation of a conventional reloading press, showing the ram of the reloading press being approximated, thus exposing the projectile, with the apparatus around the projectile.
Figure 26:
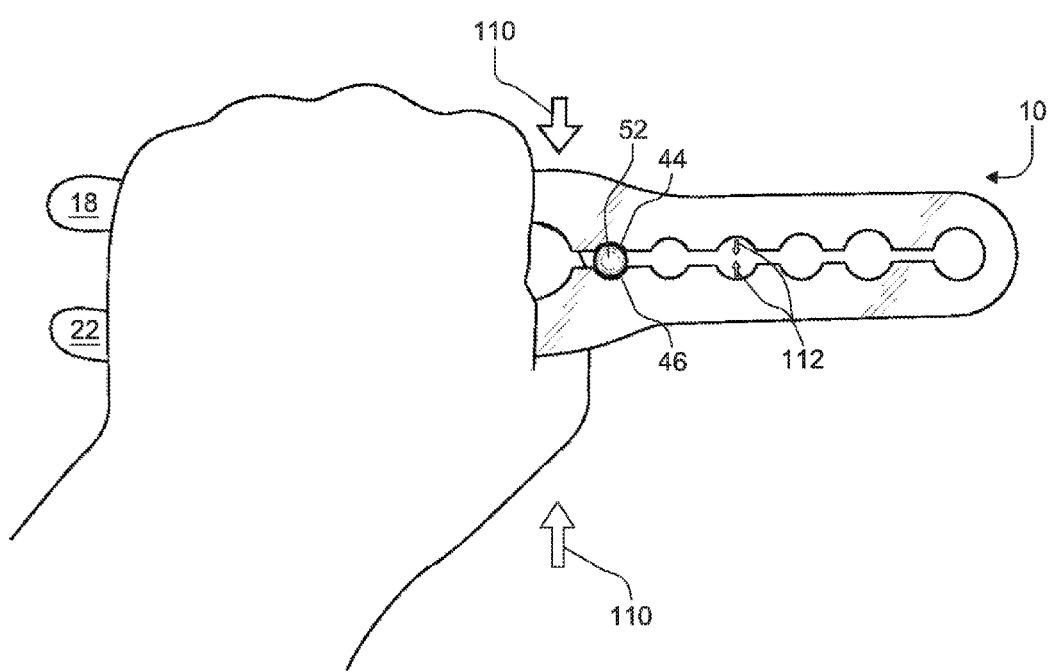
FIG. 26 is a perspective view, showing at least one pair of engagement features of the apparatus being compressed to engage the projectile.

Referring to FIGS. 25-26 and 33A, at step 3306, an operator approximates 102, 104 ram 106 of reloading press 90, thereby elevating 102 the attached cartridge 50 through receiving chamber 100 of reloading press 90 (FIG. 25); at step 3308, projectile 52 is exposed through receptacle 108 of reloading press 90; at step 3310, an operator places a pair of opposite and similarly sized engagement features 44, 46 of instrument 10 around the exposed projectile 52 (FIG. 26); and at step 3312, an operator compresses 110 handle section 18 of arm 12 towards handle section 22 of arm 14 thereby compressing 112 the pair of engagement features 44, 46 to form a friction fit between the pair of engagement features 44, 46 and projectile 52.

Figure 27:
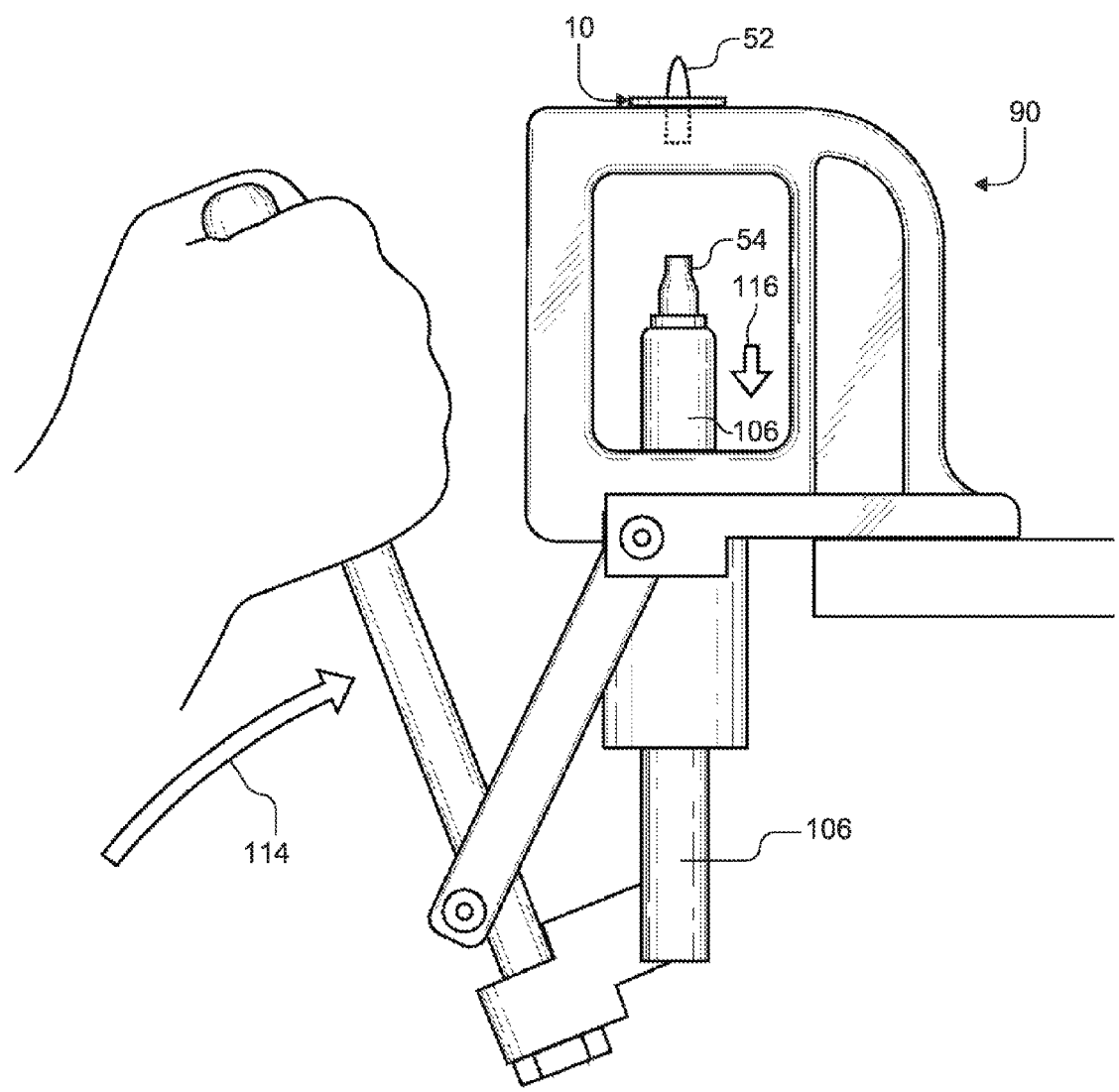
FIG. 27 is a side evaluation of a conventional reloading press, showing the ram of the reloading press being separated or distanced from the apparatus and removing the projectile (or, in other words, removing a casing from the projectile)

Referring to FIGS. 26-27 and 33A, at step 3314, an operator maintains compression 110 of handle section 18 of arm 12 towards handle section 22 of arm 14 thereby maintaining compression 112 of the pair of engagement features 44, 46 to form a friction fit between the pair of engagement features 44, 46 and projectile 52, while, at the same time, manipulating 114 reloading press 90 to lower 116 and separate or distance ram 106 from instrument 10 thereby removing projectile 52 from casing 54.

Figure 28:
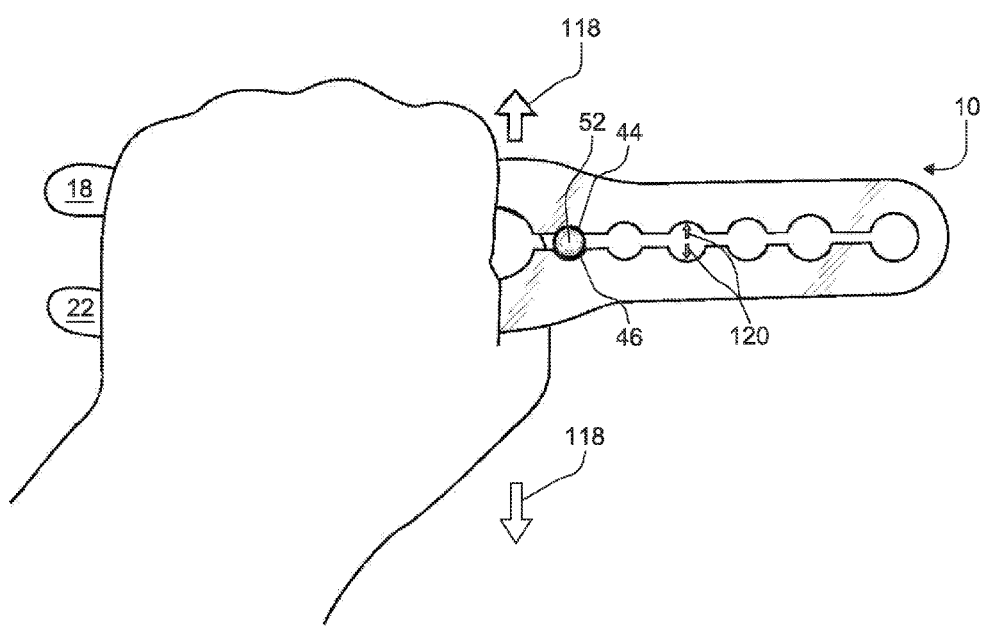
FIG. 28 is a perspective view, showing the pair of engagement features of the apparatus being released from engaging the projectile.

Referring to FIGS. 28 and 33A, at step 3316, an operator releases compression 118 of handle section 18 of arm 12 away from handle section 22 of arm 14 so that the pair of engagement features 44, 46 resiliently separate 120, thereby releasing projectile 52 from instrument 10.

In another particular implementation, referring to FIGS. 26 and 28-33A, tube structure 130 is used in conjunction with instrument 10 and reloading press 90 in order to facilitate the removal of certain projectiles 52 from casings 54 of cartridges 50 that are not long enough to expose projectiles 52 through receptacle 108 of reloading press 90, which use includes the following:

Referring to FIGS. 29-30, and 33A, at step 3300, an operator actuates 92A a reloading press 90 (and its 90 ram 106) into loading position 92B; at step 3302, an operator loads 94 cartridge 50 containing projectile 52 onto shell holder 96 of reloading press 90; and at step 3318, an operator places 132 tube structure 130 over cartridge 50, onto 134 base 136 of reloading press 90 and around ram 106 so that ram 106 can freely articulate through tube structure 130 without moving it 130.

Figure 31:
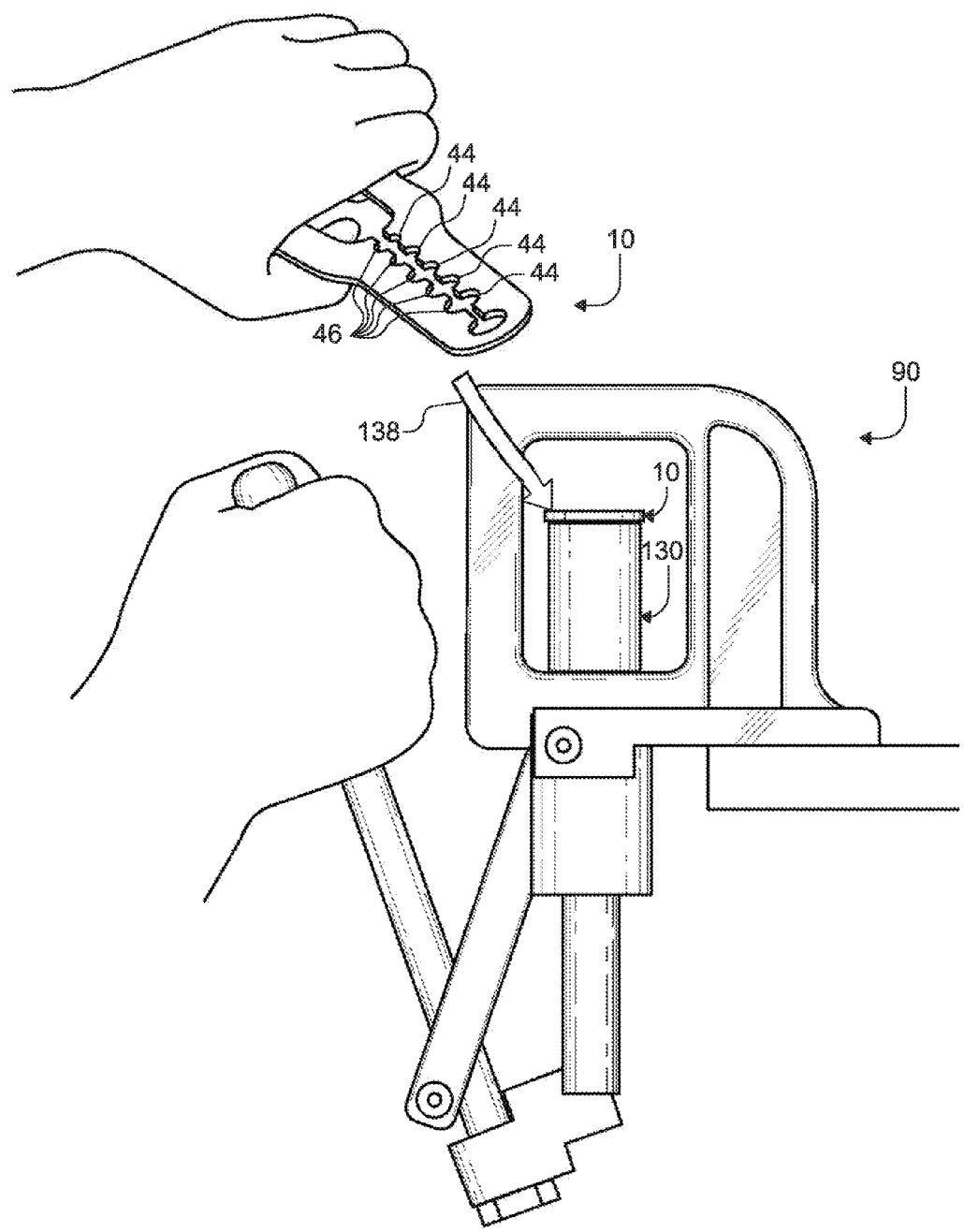
FIG. 31 is a side evaluation of a conventional reloading press, showing the reloading press, tube structure and an apparatus being placed adjacent to the tube structure anticipating the approximating of the cartridge.

Referring to FIGS. 31 and 33A, at step 3320, an operator has the option of placing 138 instrument 10 above tube structure 130 so that a particular caliber sized engagement feature 44 located on inner projectile surface 40 of projectile engagement section 20 of arm 12 and the oppositely situated and similarly caliber sized engagement feature 46 located on inner projectile surface 42 of projectile engagement section 24 of arm 14, are anticipating the approximation of projectile 52 which the engagement features 44, 46 are configured to engage.

Figure 32:
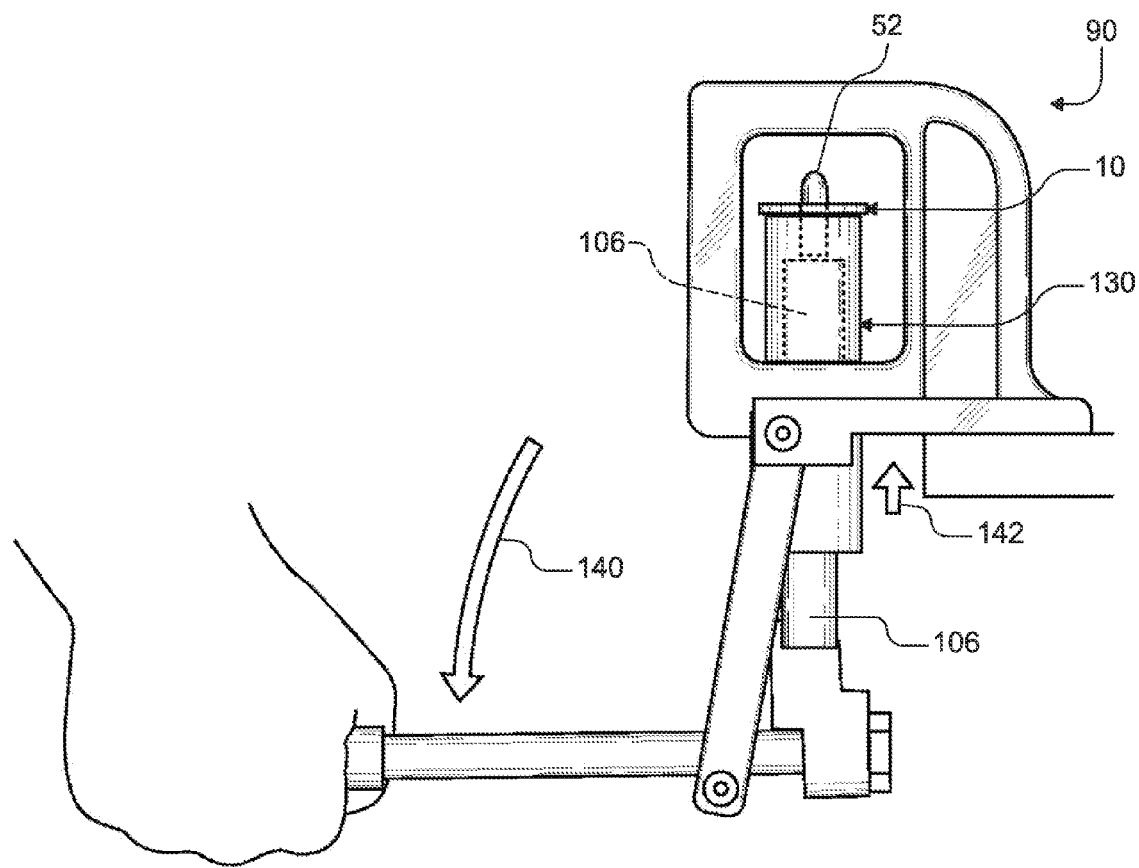
FIG. 32 is a side evaluation of a conventional reloading press, showing the approximation of the ram of the reloading press and its attached cartridge towards the apparatus in order to expose the projectile and placement of a pair of engagement features of the apparatus around the exposed projectile.

Referring to FIGS. 26, 32 and 33A, at step 3322, an operator approximates 140, 142 ram 106 of reloading press 90, thereby elevating 102 the attached cartridge 50 through tube structure 130 (FIG. 32); at step 3324, an operator exposes projectile 52; at step 3310, an operator places a pair of opposite and similarly sized engagement features 44, 46 of instrument 10 around the exposed projectile 52; and at step 3312, an operator compresses 110 handle section 18 of arm 12 towards handle section 22 of arm 14 thereby compressing 112 the pair of engagement features 44, 46 to form a friction fit between the pair of engagement features 44, 46 and projectile 52 (FIG. 26).

Referring to FIGS. 26, 33 and 33A, at step 3314, an operator maintains compression 110 of handle section 18 of arm 12 towards handle section 22 of arm 14 thereby maintaining compression 112 of the pair of engagement features 44, 46 to form a friction fit between the pair of engagement features 44, 46 and projectile 52, while, at the same time, manipulating 142 reloading press 90 to lower 144 and separating ram 106 from instrument 10 thereby removing projectile 52 from casing 54.

Referring to FIGS. 28 and 33A, at step 3316, an operator releases the compression 118 of handle section 18 of arm 12 away from handle section 22 of arm 14 so that the pair of engagement features 44, 46 resiliently separate 120, thereby releasing projectile 52 from instrument 10.

Figure 34:
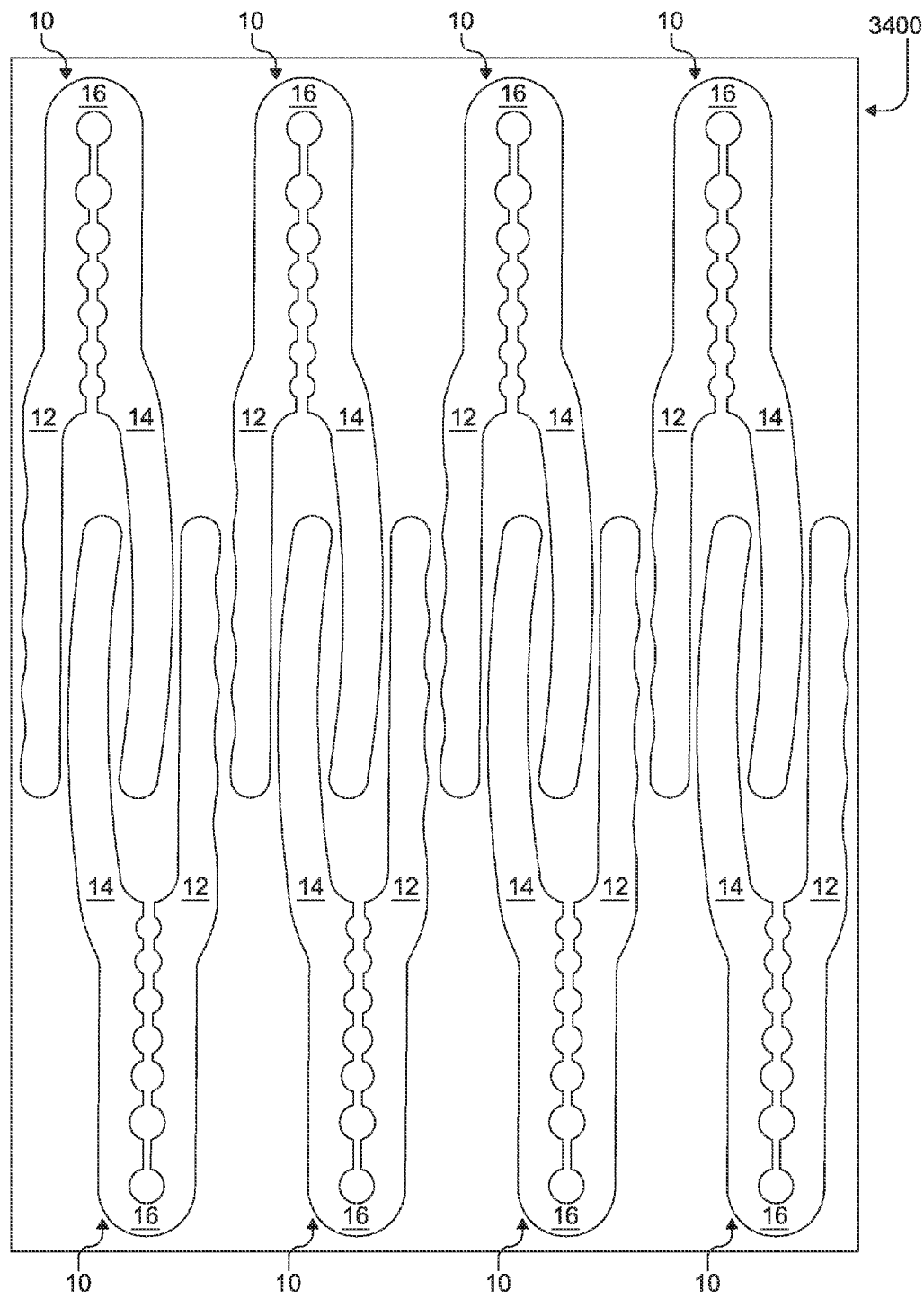
FIG. 34 is a perspective view, showing a single sheet of material from which multiple apparatuses are formed.
Figure 35:
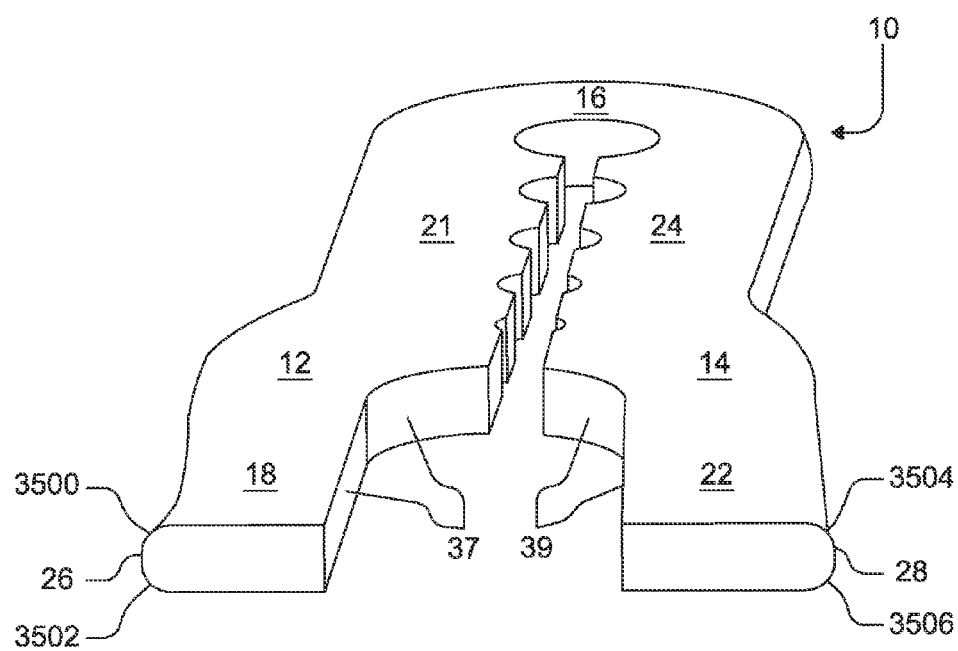
FIG. 35 is a three dimensional view, showing the handle sections of the apparatus having rounded edges.

Referring to FIGS. 1, 2, 6, 15, 16, 17, 29, 34, 35 and 36, manufacturing instrument 10 may include the following:

Forming instrument 10 from a sheet(s) of material or composite of materials. For example, material(s) may include metals such as aluminum, copper, iron, tin, gold, lead, silver, titanium, uranium, and zinc; alloys such as stainless steel, steel (iron and carbon), brass (copper and zinc), bronze (copper and tin), duralumin (aluminum and copper) and gunmetal (copper, tin, and zinc); non-metals; other materials; and/or composites such as fiberglass, plastic, wood, carbon fiber, and polyether ether ketone (PEEK). Arm 12, arm 14 and head 16 may each be formed from a single piece of material. The single piece of material may be formed from a single sheet of material 3400 (FIG. 34). Instrument 10 may be formed to various thicknesses. For example, instrument 10 may be ⅛ of an inch thick, ¼ of an inch thick, ½ of an inch thick, ¾ of an inch thick or 1 inch thick.

Once formed, manufacturing instrument 10 may include rounding any surface and/or edge of instrument 10. For example, rounding any surface and/or edge of instrument 10 may include rounding the surface and/or edge of outer surface 38A of head 16; outer handle surface 26 (FIG. 35, 3500, 3502) of handle section 18; outer handle surface 28 (FIG. 35, 3504, 3506) of handle section 22; outer projectile surface 19 and inner projectile surface 40 (FIG. 17) of projectile engagement section 20; and/or outer projectile surface 21 and inner projectile surface 42 (FIG. 17) of projectile engagement section 24. Such may increase instrument's 10 ability to engage projectiles 52; increase the number of projectiles 52 an operator may engage during a specific period of time; increase the different sizes, dimensions, types, kinds and calibers of projectiles 52 an operator may engage; increase instrument's 10 durability, strength and safety; and/or decrease damage done to projectiles 52 when using instrument 10 to engage projectiles 52.

Once formed, manufacturing instrument 10 may include altering any surface and/or edge of instrument 10. For example, referring to FIG. 15, altering instrument 10 may include altering the texture and shape of the surface and/or edge of each engagement feature 44, 46 to be configured to substantially be knobbed 1500, vertically serrated 1502, horizontally serrated 1504, pitted or blasted 1506, spiked 1508, smoothed 1510, rounded or bumped 1512. In another instance, referring to FIG. 16, the surface and/or edge of each engagement feature 44, 46 may be configured to be lined and/or fitted with or without material 74 such as rubber or plastic inserts. Such may increase instrument's 10 ability to engage projectiles 52; increase the number of projectiles 52 an operator may engage during a specific period of time; increase the different sizes, dimensions, types, kinds and calibers of projectiles 52 an operator may engage; increase instrument's 10 durability, strength and safety; and/or decrease damage done to projectiles 52 when using instrument 10 to engage projectiles 52.

Once formed, manufacturing instrument 10 may include removing any extraneous materials (FIG. 36, 3602) from instrument 10, such as shavings, slag, particles and debris.

Once formed, manufacturing instrument 10 may include treating, altering, polishing and/or finishing any surface and/or edge of instrument 10. For example, treating, altering (FIG. 3604), polishing (FIG. 36, 3606) and/or finishing the surface and/or edge of engagement features 44, 46. Such may increase instrument's 10 ability to engage projectiles 52; increase the number of projectiles 52 an operator may engage during a specific period of time; increase the different sizes, dimensions, types, kinds and calibers of projectiles 52 an operator may engage; increase instrument's 10 durability, strength and safety; and/or decrease damage done to projectiles 52 when using instrument 10 to engage projectiles 52.

Once formed, manufacturing instrument 10 may include coloring, dying, staining or painting instrument 10 and/or parts of it.

Once formed, manufacturing instrument 10 may include coverings any portion of instrument 10. For example, covering 70 handle section 18 and handle section 22. Coverings 70 may be composed of a variety of shapes, sizes, dimensions, lengths, widths, heights, angles, textures, surfaces, edges, configurations, from a variety of materials, for any reason or purpose, and any combinations of such. For example, rubbers and/or plastics. Such may increase an operator's ergonomic comfort, handling and leverage when using instrument 10; increase instrument's 10 ability to engage projectiles 52; increase the number of projectiles 52 an operator may engage during a specific period of time; increase instrument's 10 durability, strength and safety; and/or decrease damage done to projectiles 52 when using instrument 10 to engage projectiles 52.

Figure 36:
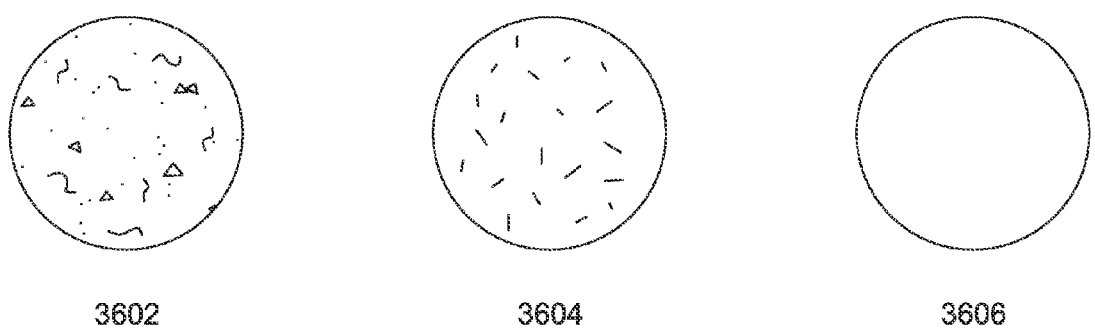
FIG. 36 is a perspective view, showing certain surface finishes of an apparatus each formed from a variety of manufacturing processes.

Once formed, manufacturing instrument 10 may include identifying 66 one or more projectile caliber sizes (FIG. 2) on instrument 10 next to one or more of the pairs 48 intended to engage a projectile of that particular caliber identified 66, which identification 66 may be applied to instrument 10 by, without limitation, one or a combination of the following processes: engraving, etching, lasering, stamping, milling, forging, drilling, grinding, casting, painting, inking, writing and/or applying additional material. Such may increase the number of projectiles 52 an operator may engage during a specific period of time and/or increase the different sizes, dimensions, types, kinds and calibers of projectiles 52 an operator may engage Forming instrument 10, rounding any surface and/or edge of instrument 10, altering any surface and/or edge of instrument 10, removing any extraneous materials from instrument 10, and treating, altering, polishing and/or finishing any surface and/or edge of instrument 10, may be accomplished by, without limitation, a variety and/or combination of means. For example, such means may include pressing, water jet cutting, laser cutting, plasma cutting, molding, casting, machining, grinding, filing, sanding, drilling, cutting, blasting, sand blasting, bead blasting, glass blasting, tumbling, barreling, heating and/or melting and/or chemicals of any kind or nature for any reason or purpose. Each said means may use a variety of materials, methods, systems and techniques for accomplishing the same. For example, tumbling may use of a variety of different materials composed of different hardness, consistency, size and types and for a variety of purposes such as removing rough edges, burs (FIG. 36, 3602) from grinding process and/or extraneous debris, and for finishing and polishing (FIG. 36, 3604, 3606) instrument 10. In another instance, sand blasting may be used to alter hard to reach places and small surfaces and crevasse such as the edges and surfaces associated with engagement features 44, 46 (FIG. 15, 1506) and inner projectile surfaces 40, 42 in order to increase instrument's 10 ability to engage projectiles 52 and/or prevent projectile 52 from slipping and sliding. In another instance, grinding may be used to remove extraneous debris (FIG. 36, 3602).

Instrument 10 may also be formed by other manufacturing techniques such as molding or casting.

Referring to FIGS. 29 and 30, tube structure 130 may be provided to an operator in order to facilitate the removal of projectiles 52 from small cartridges 50. Tube structure 130 may be long enough and wide enough to fit over cartridge 50, onto 134 base 136 of reloading press 90 and around ram 106 so that ram 106 can freely articulate through tube structure 130 without moving it 130. Tube structure 130 may be made from a variety of materials. For example, materials may include, without limitation, metals such as aluminum, copper, iron, tin, gold, lead, silver, titanium, uranium, and zinc; alloys such as stainless steel, steel (iron and carbon), brass (copper and zinc), bronze (copper and tin), duralumin (aluminum and copper) and gunmetal (copper, tin, and zinc); non-metals; other materials; and/or composites such as fiberglass, plastic, polyvinyl chloride (PVC), wood, carbon fiber, and polyether ether ketone (PEEK).

In a particular implementation, manufacturing instrument 10, includes cutting instrument 10 from a single sheet 3400 of stainless steel by means of laser cutting, which sheet 3400 is ¼ inch thick (FIG. 34).

Once cut, manufacturing instrument 10 includes rounding, at least, the edges of outer handle surface 26 (FIG. 35, 3500, 3502) and outer handle surface 28 (FIG. 35, 3504, 3506), and inner projectile surface 40 and inner projectile surface 42, which rounding is accomplished by grinding, filing and tumbling.

Once cut, manufacturing instrument 10 includes altering the surface of engagement features 44, 46 of inner projectile surface 40 and inner projectile surface 42, which altering is accomplished by sand blasting 1506 (FIG. 15).

Once cut, manufacturing instrument 10 includes removing extraneous materials such as shavings, slag, particles and debris from instrument 10 by means of grinding 3602, filing 3602 and tumbling 3604.

Once cut, manufacturing instrument 10 includes surface finishing instrument 10 by means of tumbling 3604.

Once cut, manufacturing instrument 10 includes identifying 66 all projectile caliber sizes (FIGS. 2, 20-22A) on instrument 10 next to the pair 48 of engagement features 44, 46 intended to engage projectiles of the particular caliber and type identified 66, which identification 66 is applied to instrument 10 by means of laser burning.

In another particular implementation, referring to FIGS. 29 and 30, tube structure 130 is included with the purchase of instrument 10. Tube structure 130 is 2.5 inches long and 1.5 to 1.75 inches in diameter and can fit over cartridge 50, onto 134 base 136 of reloading press 90 and around ram 106 so that ram 106 can freely articulate through tube structure 130 without moving it 130. Tube structure is made out of aluminum or stainless steel. The surface of tube structure 130 is altered by means of tumbling 3604.

Any of the structures and functions of any instrument described herein may be combined with any of the structures and function of any reloading press. For example, in the embodiments above, the press 90 may be replaced by any other existing or after-arising reloading press in order to effect engagement and separation of a projectile from a casing using an instrument and such press. As another example, in the embodiments above, the press 90 may be replaced by any other existing or after-arising non-press structure or tool (such as a pair of pliers, vice-grips, or similar tool) in order to effect engagement and separation of a projectile from a casing using a projectile engagement instrument and such non-press structure or tool. As yet another example, in the embodiments above, structures and functions of the press 90 and the instrument 10 may be replaced and/or combined by a single instrument that performs the functions of engaging a projectile and a casing simultaneously and applying force to both the projectile and the casing in order to separate them from each other.

It should be understood that the present system, instrument, apparatuses, and methods are not intended to be limited to the particular forms disclosed; rather, they are to cover all combinations, modifications, equivalents, and alternatives. A device or structure that is configured in a certain way is configured in at least that way, but may also be configured in ways that are not listed. The instrument may be configured to function with a variety of systems and methods. Different materials may be used for individual components. Different materials may be combined in a single component.

The present invention may be embodied in other specific forms without departing from its spirit or essential characteristics. It is appreciated that various features of the above described examples and embodiments may be mixed and matched to form a variety of other combinations and alternatives. It is also appreciated that this system should not be limited simply to engaging ammunition projectiles. As such, the described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An ammunition projectile engagement apparatus, comprising:
   a first arm;
   a second arm; and
   a head;
   wherein the first arm, the second arm and the head are each part of a single piece of material;
   wherein the first arm and second arm are elongated;
   wherein the first arm includes at least a first arm handle section and a first arm projectile engagement section;
   wherein the second arm includes at least a second arm handle section and a second arm projectile engagement section;

wherein the first arm projectile engagement section and the second arm projectile engagement section are at least partially separated by a channel;

wherein the first arm projectile engagement section includes at least a first inner projectile surface facing the channel;

wherein the second arm projectile engagement section includes at least a second inner projectile surface facing the channel;

wherein the first inner projectile surface and the second inner projectile surface substantially face each other;

wherein the surfaces of the first inner projectile surface and the second inner projectile surface, once formed, are treated in order to enhance the engagement of a projectile;

wherein the first inner projectile surface includes at least one first engagement feature;

wherein the second inner projectile surface includes at least one second engagement feature;

wherein the at least one first engagement feature is opposite the at least one second engagement feature;

wherein each oppositely situated set of engagement features form a pair;

wherein each pair, when compressed together, forms at least one partial circumference for engaging a projectile;

wherein each pair, when compressed together, forms at least one partial circumference comprising a diameter;

wherein, for at least the purpose of minimizing damage to a projectile, at least one portion of the diameter of at least one of the at least one partial circumference for engaging a projectile is larger in diameter than the caliber of the projectile it is intended to engage;

wherein the head is configured to permit the first arm and second arm to move at least towards each other; and wherein the first arm, the second arm, and the head are configured to resiliently bend as the first arm and second arm are forced towards each other.

2. The apparatus of claim 1, wherein the head adjoins the first arm and second arm.

3. The apparatus of claim 1, wherein the channel varies in width to accommodate different sizes, dimensions, types, kinds and calibers of projectiles.

4. The apparatus of claim 1, wherein the first inner projectile surface includes a plurality of different diameter sized first engagement features; and wherein the second inner projectile surface includes a plurality of different diameter sized second engagement features.

5. The apparatus of claim 4, further comprising:

a plurality of pairs including at least a first pair and a last pair, the plurality of pairs defined by a first sequence of the plurality of different diameter sized first engagement features in alignment with and opposite a second sequence of the plurality of different diameter sized second engagement features;

wherein the first pair has the smallest diameter of the pairs and is configured furthest from the head; and wherein the last pair has the largest diameter of the pairs and is configured closest to the head.

6. The apparatus of claim 5, wherein at least one caliber size is identified on the apparatus next to at least one of the pairs intended to engage that particular caliber sized projectile; and wherein at least one caliber size identified on the apparatus is applied to the apparatus by a process selected from at least one of the following: engraving, etching, laser burning, stamping, milling, forging, drilling, grinding, casting, painting, inking, writing and applying additional material.

7. The apparatus of claim 1, wherein the diameter of each pair of engagement features, when compressed together, are slightly larger along at least one portion of the diameter of the pair than the caliber size of a correspondingly-sized projectile for which the engagement features are intended to engage.

8. The apparatus of claim 7, wherein each pair, when compressed together, is configured to directly engage a projectile.

9. The apparatus of claim 1, further comprising a first outer surface of the first arm handle section, wherein the first outer surface includes at least one concave curve, and wherein the at least one concave curve of the first outer surface of the first arm handle section is shaped to accommodate an operator's convexly profiled finger.

10. The apparatus of claim 9, wherein the first outer surface of the first arm handle section includes at least four concave curves, and wherein the at least four concave curves are shaped to accommodate an operator's convexly profiled fingers.

11. The apparatus of claim 10, further comprising a second outer surface of the second arm handle section, wherein at least a portion of the second outer surface forms a convex curve, and wherein the convex curve is shaped to accommodate an operator's concavely profiled palm.

12. The apparatus of claim 1, further comprising a second material, wherein the first arm handle section and second arm handle section are covered by the second material, and wherein the second material is different from the single piece of material.

13. The apparatus of claim 1, wherein the single piece of material is formed from a single sheet of material.

14. The apparatus of claim 1, wherein the apparatus is formed from at least one of the following: metals, alloys, non-metals, and composites.

15. A method of manufacturing an ammunition projectile engagement apparatus, comprising:

forming the apparatus, wherein the apparatus comprises:
at least one surface;
a first arm;
a second arm;
and a head;
wherein the first arm, the second arm and the head are each part of a single piece of material;
wherein the first arm and second arm are elongated;
wherein the first arm includes at least a first arm handle section and a first arm projectile engagement section;
wherein the second arm includes at least a second arm handle section and a second arm projectile engagement section;
wherein the first arm projectile engagement section and the second arm projectile engagement section are at least partially separated by a channel;
wherein the first arm projectile engagement section includes at least a first inner projectile surface facing the channel;
wherein the second arm projectile engagement section includes at least a second inner projectile surface facing the channel;
wherein the first inner projectile surface and the second inner projectile surface substantially face each other;
wherein the surfaces of the first inner projectile surface and the second inner projectile surface, once formed, are treated in order to enhance the engagement of a projectile;
wherein the first inner projectile surface includes at least one first engagement feature;
wherein the at least one first engagement feature has at least one edge and at least one surface;
wherein the second inner projectile surface includes at least one second engagement feature;

wherein the at least one second engagement feature has at least one edge and at least one surface;

wherein the at least one first engagement feature is opposite the at least one second engagement feature;

wherein each oppositely situated set of engagement features form a pair;

wherein each pair, when compressed together, forms at least one partial circumference for engaging a projectile;

wherein each pair, when compressed together, forms at least one partial circumference comprising a diameter;

wherein, for at least the purpose of minimizing damage to a projectile, at least one portion of the diameter of at least one of the at least one partial circumferences for engaging a projectile is larger in diameter than the caliber of the projectile it is intended to engage;

wherein the head is configured to permit the first arm and second arm to move at least towards each other; and wherein the first arm, the second arm, and the head are configured to resiliently bend as the first arm and second arm are forced towards each other;

rounding the at least one edge of the apparatus;

altering the at least one edge of the at least one first engagement feature, the at least one surface of the at least one first engagement feature, the at least one edge of the at least one second engagement feature, and the at least one surface of the at least one second engagement feature;

removing extraneous material from the apparatus when extraneous material is present; and finishing the at least one surface of the apparatus.

16. The method of claim 15, wherein the altering of the at least one edge of the at least one first engagement feature, the at least one surface of the at least one first engagement feature, the at least one edge of the at least one second engagement feature, and the at least one surface of the at least one second engagement feature, is accomplished by means of sand blasting; and wherein the finishing of the at least one surface of the apparatus is accomplished by means of tumbling.

17. The method of claim 15 further comprising identifying at least one projectile caliber size on the apparatus next to at least one pair of engagement features intended to engage a projectile of the caliber identified.

18. The method of claim 15 further comprising placing coverings on the first arm handle section and the second arm handle section.

19. A method of engaging a projectile using an ammunition projectile engagement apparatus, comprising:

actuating a reloading press to a loading position, wherein the reloading press comprising a shell holder and a ram;

loading a cartridge containing a casing and a projectile onto the shell holder of the reloading press;

approximating the ram of the reloading press and attached cartridge; exposing the projectile;

handling the apparatus, wherein the apparatus comprising:
a first arm;
a second arm;
and a head:
wherein the first arm, the second arm and the head are each part of a single piece of material;
wherein the first arm and second arm are elongated;
wherein the first arm includes at least a first arm handle section and a first arm projectile engagement section;
wherein the second arm includes at least a second arm handle section and a second arm projectile engagement section;
wherein the first arm projectile engagement section and the second arm projectile engagement section are at least partially separated by a channel;
wherein the first arm projectile engagement section includes at least a first inner projectile surface facing the channel;
wherein the second arm projectile engagement section includes at least a second inner projectile surface facing the channel;
wherein the first inner projectile surface and the second inner projectile surface substantially face each other;
wherein the surfaces of the first inner projectile surface and the second inner projectile surface, once formed, are treated in order to enhance the engagement of a projectile;
wherein the first inner projectile surface includes at least one first engagement feature;
wherein the second inner projectile surface includes at least one second engagement feature;
wherein the at least one first engagement feature is opposite the at least one second engagement feature;
wherein each oppositely situated set of engagement features form a pair;
wherein each pair, when compressed together, forms at least one partial circumference for engaging a projectile;
wherein each pair, when compressed together, forms at least one partial circumference comprising a diameter;
wherein, for at least the purpose of minimizing damage to a projectile, at least one portion of the diameter of at least one of the at least one partial circumferences for engaging a projectile is larger in diameter than the caliber of the projectile it is intended to engage;
wherein the head is configured to permit the first arm and second arm to move at least towards each other; and
wherein the first arm, the second arm, and the head are configured to resiliently bend as the first arm and second arm are forced towards each other;

placing at least one convexly profiled finger on the first arm of the apparatus which includes at least one concave curve and handling the second arm of the apparatus;

placing a pair of opposite and similarly sized engagement features of the apparatus around the exposed projectile;

compressing the pair of opposite and similarly sized engagement features around at least a portion of the projectile;

maintaining compression of the pair of opposite and similarly sized engagement features while distancing the ram from the apparatus, thereby removing the projectile from the casing of the cartridge; and releasing the compression, wherein the pair of opposite and similarly sized engagement features resiliently separate, thereby releasing the projectile from the apparatus.

20. The method of claim 19, further comprising placing the apparatus adjacent to at least one of the reloading press and a tube structure.

* * * * *

UNITED STATES PATENT AND TRADEMARK OFFICE
CERTIFICATE OF CORRECTION

| | |
|---|---|
| PATENT NO. | : 9,103,642 B2 |
| APPLICATION NO. | : 14/262656 |
| DATED | : August 11, 2015 |
| INVENTOR(S) | : N. Eugene Crandall and Brandon R. Williams |

It is certified that error appears in the above-identified patent and that said Letters Patent is hereby corrected as shown below:

Column 2, Line 41, "profiled o palm" should be --profiled palm--.

Column 3, Line 2, "apparatus may accomplished" should be --apparatus may be accomplished--; and
Column 3, Line 60, "apparatus" should be --apparatuses--.

Column 4, Line 26, "operator's" should be --operator--; and
Column 4, Line 43, "amount" should be --amounts--.

Column 6, Line 55, "including" should be --include--.

Column 7, Line 7, "instrument's" should be --instrument--; and
Column 7, Line 41, "from" should be --form--.

Column 10, Line 19, "varied" should be --vary--; and
Column 10, Line 19, "implementations" should be --implementation--.

Column 17, Line 59, "designed for" should be --is designed for--.

Column 18, Line 5, "operate" should be --operator--.

Column 20, Line 37, "coverings" should be --covering--.

Column 22, Line 12, "function" should be --functions--.

Claim 19, Column 25, Line 55, "comprising" should be --comprises--.

Signed and Sealed this
Seventeenth Day of March, 2020

Andrei Iancu
*Director of the United States Patent and Trademark Office*